(12) United States Patent
Okuzu et al.

(10) Patent No.: US 8,247,068 B2
(45) Date of Patent: Aug. 21, 2012

(54) COATING MATERIAL FOR FORMING GAS-BARRIER LAYER AND GAS-BARRIER MULTILAYER BODY

(75) Inventors: Takayoshi Okuzu, Uji (JP); Hideki Kuwata, Uji (JP); Mitsuo Yoshida, Tokyo (JP); Junji Okamoto, Tokyo (JP); Kunihiko Ozaki, Tokyo (JP); Miyuki Kamoshita, Tokyo (JP); Reiko Ueno, Tokyo (JP)

(73) Assignees: Unitika Ltd., Hyogo (JP); Toyo Ink Manufacturing Co., Ltd., Tokyo (JP)

( * ) Notice: Subject to any disclaimer, the term of this patent is extended or adjusted under 35 U.S.C. 154(b) by 592 days.

(21) Appl. No.: 12/310,423

(22) PCT Filed: Aug. 30, 2007

(86) PCT No.: PCT/JP2007/066844
§ 371 (c)(1),
(2), (4) Date: Feb. 23, 2009

(87) PCT Pub. No.: WO2008/026672
PCT Pub. Date: Mar. 6, 2008

(65) Prior Publication Data
US 2010/0239852 A1 Sep. 23, 2010

(30) Foreign Application Priority Data

Aug. 30, 2006 (JP) ................................ 2006-233729
Aug. 30, 2006 (JP) ................................ 2006-233730

(51) Int. Cl.
*B32B 5/16* (2006.01)
*B32B 27/00* (2006.01)
*B32B 23/04* (2006.01)
*C08L 5/00* (2006.01)

(52) U.S. Cl. ........ 428/328; 428/323; 428/330; 428/500; 428/532; 428/689; 524/27; 524/80; 524/315; 524/417; 524/423; 524/437; 524/502; 524/503; 524/515

(58) Field of Classification Search .................... None
See application file for complete search history.

(56) References Cited

U.S. PATENT DOCUMENTS

| 3,248,360 A * | 4/1966 | Hallenbeck .................. 525/340 |
| 7,435,446 B2 * | 10/2008 | Kamoshita .................. 427/335 |
| 8,114,521 B2 * | 2/2012 | Kuwata et al. .............. 428/425.9 |
| 2006/0054263 A1 * | 3/2006 | Kamoshita ...................... 156/60 |

FOREIGN PATENT DOCUMENTS

| EP | 1 086 981 | 3/2001 |
| EP | 1 548 074 | 6/2005 |
| JP | 54-037099 | 3/1979 |
| JP | 56-057852 | 5/1981 |
| JP | 57-027927 | 2/1982 |
| WO | WO 2004/089625 | * 10/2004 |
| WO | 2006/008120 | 1/2006 |

* cited by examiner

*Primary Examiner* — Sheeba Ahmed
(74) *Attorney, Agent, or Firm* — Fildes & Outland, P.C.

(57) ABSTRACT

Disclosed is a coating material for forming a gas barrier. The coating material includes a polyalcohol polymer, a polycarboxylic acid polymer, and a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component. By applying this coating material to a plastic substrate layer, a gas-barrier multilayer body having a gas-barrier layer formed thereon is obtained.

15 Claims, No Drawings

COATING MATERIAL FOR FORMING GAS-BARRIER LAYER AND GAS-BARRIER MULTILAYER BODY

TECHNICAL FIELD

The present invention relates to a coating material for forming a gas-barrier layer and a gas-barrier multilayer body.

BACKGROUND ART

Thermoplastic resin films such as polyamide film and polyester film are excellent in strength, transparency and formability, and accordingly are used as packaging materials in a wide range of applications. However, these thermoplastic resin films are high in the permeability for a gas such as oxygen, and hence when these thermoplastic resin films are used for packaging general food, retort processed food, cosmetics, medical supplies, agricultural chemicals and the like, long-term storage of such packaged objects may cause the deterioration of the contents of the packages due to the gas such as oxygen penetrating through the film.

Thus, multilayer films in which a polyvinylidene chloride (hereinafter abbreviated as "PVDC") layer having a high gas-barrier property is formed by coating the surface of a thermoplastic resin with an emulsion of PVDC or the like are widely used for food packaging and the like. However, PVDC generates organic substances such as acidic gases at the time of incineration of packaging films after the disposal of the packaging films. Accordingly, in these years, switching to other materials has been strongly desired as the concern about the environment has grown.

As a substitute material for PVDC, polyvinyl alcohol (hereinafter abbreviated as "PVA") does not generate poisonous gas and is high in the gas-barrier property under low-humidity atmosphere. However, the gas-barrier property of PVA is steeply degraded with increasing humidities. Accordingly, in many cases, it is impossible to use PVA for packaging water-containing food or the like.

Known as a polymer improved in such gas-barrier degradation as found for PVA under high humidity is a copolymer between vinyl alcohol and ethylene. Hereinafter the copolymer is abbreviated as "EVOH". However, for the purpose of maintaining at a practical level the gas-barrier property under high humidity, it is necessary to increase the copolymerization proportion of ethylene to some extent, and such a polymer as obtained with increased ethylene proportion becomes poorly soluble in water. Thus, for the purpose of obtaining a coating material by using an EVOH that is high in the copolymerization proportion of ethylene, it is necessary to use an organic solvent or a mixed solvent composed of water and an organic solvent. However, such a case is not desirable from the viewpoint of environmental issues, due to the use of an organic solvent, and the cost increase is disadvantageously caused by the necessity of a step of collecting the organic solvent or other steps.

As methods in which a liquid composition composed of a water-soluble polymer is applied to a film to attain a high gas-barrier property even under high humidity, there have been proposed methods in which an aqueous solution composed of PVA and a partially neutralized product of polyacrylic acid or polymethacrylic acid is applied to a film and heat treated for cross-linking of both polymers through ester bonds (JP-A-06-220221, JP-A-07-102083, JP-A-07-205379, JP-A-07-266441, JP-A-08-041218 and JP-A-10-237180).

However, the methods proposed in these documents require, for the purpose of attaining a high gas-barrier property, a heat treatment at high temperatures or a heat treatment over a long period of time, and thus require a huge amount of energy at the time of production of a gas-barrier layer to result in loading not a small amount of burden on the environment.

Additionally, such a heat treatment at high temperatures causes a possibility that PVA or the like constituting the gas-barrier layer is discolored or decomposed, and moreover, the substrate such as a plastic film having the gas-barrier layer laminated thereon undergoes deformation such as wrinkle formation so as to inhibit the use as a packaging material. For the purpose of preventing the deterioration of the plastic substrate, it is required to use as the substrate a specific heat-resistant plastic film sufficiently resistible to high-temperature heating, accordingly leading to a drawback from the viewpoints of general versatility and economic efficiency.

On the other hand, when the heat treatment temperature is low, an extremely long-time treatment is required and hence the productivity is disadvantageously degraded.

An investigation has also been made to solve the problem found in the above-described film coated with PVA by introducing a cross-linked structure into PVA. However, in general, although the humidity dependence of the oxygen gas-barrier property of the PVA film is decreased with the increase of the cross-link density, the oxygen gas-barrier property intrinsically possessed by the PVA film under dry conditions is degraded. Consequently, it is extremely difficult to obtain a satisfactory oxygen gas-barrier property under high humidity.

In general, although cross-linking of polymer molecules improves the water resistance, because the gas-barrier property is a property associated with the prevention of penetration or diffusion of relatively small molecules such as oxygen molecules, simple cross-linking of a polymer does not necessarily lead to attaining gas-barrier property. For example, three-dimensionally cross-linked polymers of epoxy resin, phenolic resin and the like have no gas-barrier property.

There is proposed a method in which a gas-barrier multilayer body that has a high gas-barrier property, despite the use of a water-soluble polymer such as PVA, even under high humidity is obtained with a heat treatment lower in temperature or shorter in time than in conventional cases (JP-A-2001-323204, JP-A-2002-020677 and JP-A-2002-241671). The coating agents described in these documents enable to form gas-barrier multilayer bodies having a higher gas-barrier property, despite the use of water-soluble polymers, than in conventional cases even under high humidity, with heating lower in temperature or shorter in time than in the cases of the above-described cross-linking coating agents.

However, when applied are only the methods described in these documents in which methods the hydroxyl groups in PVA and the COOH groups in polyacrylic acid or in an ethylene-maleic acid copolymer are subjected to an esterification reaction with each other by heating, long-time storage of the thus obtained films with a gas-barrier layer formed thereon, under high temperature and high humidity results in the decomposition of the ester bonds due to hydrolysis to remarkably degrade the gas-barrier property.

As described above, only the heating and curing of a coating agent cannot meet more severe requirements.

As a method for producing by applying a moderate heat treatment a gas-barrier film that attains a high-degree gas-barrier property, there have been proposed methods for producing a gas-barrier multilayer body in which methods a coating material for forming a gas-barrier layer composed of a polyalcohol polymer and a polycarboxylic acid polymer is applied, then a short-time heat treatment is conducted, and then a heat treatment is conducted in the presence of water containing a monovalent metal compound and/or a basic organic compound and a divalent or higher-valent metal compound (JP-A-2005-270907, JP-A-2005-271516 and JP-A-2005-272758). According to these production methods, no degradation of the gas-barrier property is found over a long term under high temperature and high humidity atmosphere. However, the above-described methods need a process in which a set of coating and drying or a set of coating, immersing and drying is repeated a plurality of times, and hence are complicated in the production process and may also need a huge amount of energy.

There have been proposed those methods in which by one-time coating with a coating liquid using a polycarboxylic acid and a multivalent metal compound, an ionic cross-linked structure is introduced into a coating layer to attain a high-degree gas-barrier property (JP-A-2005-126528 and JP-A-2005-126539). Also, according to these production methods, no degradation of the gas-barrier property is found over a long term under high temperature and high humidity atmosphere. However, these methods use a volatile base or an organic solvent in a large amount, and hence are not desirable from the viewpoint of environmental issues. Additionally, these methods need a step of collecting the volatile base or the organic solvent and so on, and hence the cost is disadvantageously increased.

DISCLOSURE OF THE INVENTION

The subject of the present invention is to enable the fabrication of a gas-barrier multilayer body that has a higher gas-barrier property under high humidity, despite the use of a water-soluble polymer, than in conventional cases, and maintains an excellent gas-barrier property even under high temperature and high humidity atmosphere, without applying a process in which a set of coating and drying is repeated a plurality of times, and further, without using substances that load a burden on the environment, such as a volatile base or an organic solvent.

As a result of a diligent study, the present inventors have reached the present invention by discovering that the above-described problem can be solved by applying a coating material having a specific composition to a plastic substrate to form a gas-barrier layer.

The gist of the present invention is as follows.

(1) A coating material for forming a gas-barrier layer, including: a polyalcohol polymer; a polycarboxylic acid polymer; and a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component.

(2) The coating material for forming a gas-barrier layer according to (1), wherein the polyalcohol polymer is any of polyvinyl alcohol, a copolymer between ethylene and vinyl alcohol and a saccharide.

(3) The coating material for forming a gas-barrier layer according to (1) or (2), wherein the polycarboxylic acid polymer is a polymer that is obtained by polymerizing a monomer having a carboxyl group or an acid anhydride group and an ethylenically unsaturated double bond and contains a carboxyl group or an acid anhydride group but no hydroxyl group.

(4) The coating material for forming a gas-barrier layer according to (3), wherein the polycarboxylic acid polymer is an ethylene-maleic acid copolymer.

(5) The coating material for forming a gas-barrier layer according to any one of (1) to (4), wherein the monovalent metal compound is a compound including at least one metal selected from the group consisting of alkali metals and the divalent or higher-valent metal compound is a compound including a metal selected from the group consisting of alkali earth metals and transition metals.

(6) The coating material for forming a gas-barrier layer according to (5), wherein the alkali metal is at least one metal selected from the group consisting of Li, Na and K, and the alkali earth metal or the transition metal is at least one metal selected from the group consisting of Mg, Ca, Zn, Cu and Co.

(7) The coating material for forming a gas-barrier layer according to any one of (1) to (6), wherein the poorly water-soluble component coating the surface of each of the metal compounds is any of a fatty acid ester organic compound, a phosphoric acid ester organic compound, calcium phosphate, aluminum hydroxide and barium sulfate.

(8) A gas-barrier multilayer body including a plastic substrate layer and a gas-barrier layer, wherein the gas-barrier layer is formed of a coating material for forming a gas-barrier layer, the coating material including: a polyalcohol polymer; a polycarboxylic acid polymer; and a divalent or higher-valent metal compound whose surface is coated with a poorly water-soluble component, or alternatively a monovalent metal compound whose particle surface is coated with a poorly water-soluble component and a divalent or higher-valent metal compound whose particle surface is coated with a poorly water-soluble component.

(9) A gas-barrier multilayer body including a plastic substrate layer and a gas-barrier layer, wherein the gas-barrier layer is formed by laminating two layers consisting of a barrier layer formed of a coating material including a polyalcohol polymer and a polycarboxylic acid polymer and a metal compound-containing resin layer, wherein the metal compound-containing resin layer including: a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component; and a resin.

(10) The gas-barrier multilayer body according to (9), wherein the polyalcohol polymer is any of polyvinyl alcohol, a copolymer between ethylene and vinyl alcohol and a saccharide.

(11) The gas-barrier multilayer body according to (9), wherein the polycarboxylic acid polymer is a polymer that is obtained by polymerizing a monomer having a carboxyl group or an acid anhydride group and an ethylenically unsaturated double bond and contains a carboxyl group or an acid anhydride group but no hydroxyl group.

(12) The gas-barrier multilayer body according to (11), wherein the polycarboxylic acid polymer is an ethylene-maleic acid copolymer.

(13) The gas-barrier multilayer body according to (9), wherein the monovalent metal compound is a compound including at least one metal selected from the group consisting of alkali metals and the divalent or higher-valent metal compound is a compound including a metal selected from the group consisting of alkali earth metals and transition metals.

(14) The gas-barrier multilayer body according to (13), wherein the alkali metal is at least one metal selected from the group consisting of Li, Na and K, and the alkali earth metal or the transition metal is at least one metal selected from the group consisting of Mg, Ca, Zn, Cu and Co.

(15) The gas-barrier multilayer body according to (9), wherein the poorly water-soluble component coating the particle surface of each of the metal compounds is any of a fatty acid ester organic compound, a phosphoric acid ester organic compound, calcium phosphate, aluminum hydroxide and barium sulfate.

The coating material for forming a gas barrier layer of the present invention enables to fabricate a gas-barrier multilayer body that maintains an excellent gas-barrier property even under high temperature and high humidity atmosphere. Moreover, in the process for producing the multilayer body, a plurality of times of high temperature heat treatments are not required to be applied, and neither any organic solvent nor any volatile base is used. Further, the coating material concerned enables to provide a gas-barrier multilayer body that does not pollute the environment because such a gas-barrier multilayer body does not generate any harmful substance such as dioxin at the time of incineration thereof.

BEST MODE FOR CARRYING OUT THE INVENTION

Hereinafter, the present invention is described in detail.

The gas-barrier multilayer body of the present invention is a body in which a gas-barrier layer is formed on a plastic substrate, and the gas-barrier layer involves two aspects.

A first aspect of the gas-barrier layer is formed of a coating material for forming a gas-barrier layer including: a polyalcohol polymer; a polycarboxylic acid polymer; and a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component. In other words, the gas-barrier layer of the first aspect is of a single layer. Hereinafter, the coating material for forming the gas-barrier layer of the first aspect is referred to as the coating material for forming a gas-barrier layer of the present invention or is simply referred as the coating material of the present invention.

In a second aspect, the gas-barrier layer is formed of two layers, namely, a barrier layer and a metal compound-containing resin layer. The barrier layer is formed of a coating material for forming a barrier layer including a polyalcohol polymer and a polycarboxylic acid polymer. Hereinafter, the coating material for forming a barrier layer used in the second aspect is also referred to as a first coating material. On the other hand, the metal compound-containing resin layer is formed of a second coating material including: a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component; and a resin. In other words, the second aspect is formed of two independent layers, namely, the barrier layer to bear a fundamental barrier property, formed by the ester-cross-linking between the polyalcohol polymer and the polycarboxylic acid polymer and the metal compound-containing resin layer to bear the maintenance of the barrier property of the barrier layer. The metal compound-containing resin layer is required only to abut to the barrier layer, and examples of the selectable multilayer configuration may include a plastic substrate/metal compound-containing resin layer/barrier layer multilayer configuration and a plastic substrate/barrier layer/metal compound-containing resin layer multilayer configuration.

The coating material for forming a gas-barrier layer of the present invention is a coating material including: a polyalcohol polymer; a polycarboxylic acid polymer; and a divalent or higher-valent metal compound whose surface is coated with a poorly water-soluble organic component or inorganic component, or alternatively a monovalent metal compound whose surface is coated with a poorly water-soluble organic component or inorganic component and a divalent or higher-valent metal compound whose surface is coated with a poorly water-soluble organic component or inorganic component.

The polyalcohol polymer used in the present invention is an alcohol polymer having two or more hydroxyl groups in a molecule thereof. Examples of such a polyalcohol polymer include polyvinyl alcohol, a copolymer between ethylene and vinyl alcohol and a saccharide.

The saponification degree of polyvinyl alcohol and the saponification degree of the copolymer between ethylene and vinyl alcohol are each preferably 95 mol % or more and more preferably 98 mol % or more. The average degree of polymerization of polyvinyl alcohol and the ethylene-vinyl alcohol copolymer are each preferably 50 to 4000.

As the saccharide, monosaccharides, oligosaccharides and polysaccharides can be used. These saccharides also include: sugar alcohols, various substitution products thereof and various derivatives thereof; and cyclic oligosaccharides such as cyclodextrins. These saccharides are preferably water-soluble. The polysaccharides include starches. Examples of the starches usable in the present invention include: raw starches (nonmodified starches) such as wheat starch, corn starch, waxy corn starch, potato starch, tapioca starch, rice starch, sweet potato starch and sago starch; and various processed starches. Examples of the processed starches include physically modified starch, enzymatically modified starch, chemical-decomposition-modified starch, chemically modified starch, and grafted starches obtained by graft-polymerization of monomers onto starches. Preferable among these starches are water-soluble processed starches such as roasted dextrins and saccharified reduced-starches obtained by alcoholizing the reducing terminals of such dextrins. The starches may be hydrates. These starches can be used each alone or in combinations of two or more thereof.

Examples of the polycarboxylic acid polymer used in the present invention include a polymer that is obtained by polymerizing a monomer having a carboxyl group or an acid anhydride group and an ethylenically unsaturated double bond. This polymer contains a carboxyl group or an acid anhydride group but no hydroxyl group.

Preferable as the monomer having a carboxyl group or an acid anhydride group and an ethylenically unsaturated double bond are monomers having, as the ethylenically unsaturated double bond, an acryloyl group or a methacryloyl group. Examples of such a monomer include (meth)acrylic acid, 2-carboxyethyl (meth)acrylate, ω-carboxy-polycaprolactone monoacrylate, maleic acid, maleic anhydride, fumaric acid, fumaric anhydride, citraconic acid, citraconic anhydride, itaconic acid and itaconic anhydride. Preferable among these are (meth)acrylic acid, maleic acid, maleic anhydride, itaconic acid and itaconic anhydride.

As the polymer that is obtained by polymerizing a monomer having a carboxyl group or an acid anhydride group and an ethylenically unsaturated double bond and contains, as described above, a carboxyl group or an acid anhydride group but no hydroxyl group, the following may be quoted. Specifically, examples of such a polymer may include: homopolymers obtained by independently polymerizing these monomers each having a carboxyl group or an acid anhydride group and an ethylenically unsaturated double bond; copolymers obtained by mutually copolymerizing a plurality of monomers each having a carboxyl group or an acid anhydride group and an ethylenically unsaturated double bond; and copolymers obtained by copolymerizing a monomer having a carboxyl group or an acid anhydride group and an ethylenically unsaturated double bond with another monomer.

The coating material of the present invention may include two or more types of the homopolymers, two or more types of the copolymers between monomers each having a carboxyl group or an acid anhydride group and an ethylenically unsaturated double bond, or two or more types of the copolymers between a monomer having a carboxyl group or an acid anhydride group and an ethylenically unsaturated double bond and another monomer.

Further, as the polymer that is obtained by polymerizing a monomer having a carboxyl group or an acid anhydride group and an ethylenically unsaturated double bond and contains a carboxyl group or an acid anhydride group but no hydroxyl group, the following may be quoted. Specifically, examples of such a polymer may also include: a copolymer obtained by mutually copolymerizing a homopolymer and a monomer having a carboxyl group or an acid anhydride group and an ethylenically unsaturated double bond; a copolymer obtained by copolymerizing a homopolymer with a monomer having a carboxyl group or an acid anhydride group and an ethylenically unsaturated double bond and another monomer; a copolymer obtained by mutually copolymerizing monomers each having a carboxyl group or an acid anhydride group and an ethylenically unsaturated double bond; and a copolymer obtained by copolymerizing a monomer having a carboxyl group or an acid anhydride group and an ethylenically unsaturated double bond with another monomer.

As another monomer copolymerizable with the monomer having a carboxyl group or an acid anhydride group and an ethylenically unsaturated double bond, a monomer having neither a carboxyl group nor an acid anhydride group and being copolymerizable with the monomer having a carboxyl group or an acid anhydride group and an ethylenically unsaturated double bond may be appropriately used. Examples of such a monomer include: $\alpha$-olefins having 2 to 30 carbon atoms such as a monomer that is an esterification product of an unsaturated monocarboxylic acid such as crotonic acid or (meth)acrylic acid and has neither a carboxyl group nor a hydroxyl group, (meth)acrylamide, (meth)acrylonitrile, styrene, styrenesulfonic acid, vinyl toluene and ethylene; alkyl vinyl ethers; and vinylpyrrolidone.

In the present invention, as a polymer that is obtained by polymerizing a monomer having a carboxyl group or an acid anhydride group and an ethylenically unsaturated double bond and contains a carboxyl group or an acid anhydride group but no hydroxyl group, an ethylene-maleic acid copolymer (hereinafter abbreviated as "EMA") may be preferably used. EMA is obtained by polymerizing maleic anhydride and ethylene on the basis of a known method such as solution radical polymerization. The content of the maleic acid unit in EMA is preferably 5 mol % or more, more preferably 10 mol % or more, furthermore preferably 15 mol % or more and most preferably 30 mol % or more.

A cross-linking agent may be added to the coating material for forming a gas-barrier layer of the present invention for the purpose of improving the heat resistance and the solvent resistance of the gas-barrier layer.

The cross-linking agent may also be a cross-linking agent having self-cross-linkability, a compound having in the molecule thereof a plurality of functional groups that react with a carboxyl group and/or a hydroxyl group, a metal complex having a multivalent coordination position, or the like.

Among these, isocyanate compounds, melamine compounds, urea compounds, epoxy compounds, carbodiimide compounds, zirconium salt compounds and the like are preferable because these compounds enable to attain excellent gas-barrier property. Specifically, examples of such compounds include the following multifunctional isocyanates: aromatic polyisocyanates such as tolylene diisocyanate, diphenylmethane isocyanate and polymethylene polyphenylene polyisocyanate; and aliphatic polyisocyanates such as hexamethylene diisocyanate and xylene isocyanate. These cross-linking agents may be used in combination.

For the purpose of promoting the cross-linking reaction to improve the gas-barrier property, a catalyst such as an acid may also be added. The addition of a catalyst promotes a cross-linking reaction, through ester bonds, between the polyalcohol polymer and the polycarboxylic acid polymer to enable a further improvement of the gas-barrier property.

Described are the monovalent metal compound whose surface is coated with a poorly water-soluble component and the divalent or higher-valent metal compound whose surface is coated with a poorly water-soluble component contained in the coating material for forming a gas-barrier layer of the present invention. In the coating material for forming a gas-barrier layer of the present invention, the monovalent metal compound whose surface is coated with a poorly water-soluble component and the divalent or higher-valent metal compound whose surface is coated with a poorly water-soluble component are contained each alone or in combinations of two or more thereof. A plurality of those compounds which contain one and the same metal species but are different in forms may also be contained. The monovalent metal compounds are metal compounds having an alkali metal as a constituent element, and examples of such a metal species include Li, Na, K, Rb and Se. The smaller is the atomic radius of the alkali metal constituting the monovalent metal compound, the more the gas-barrier property is improved. Preferable among these are Li, Na and K, and particularly preferable are Li and Na. The divalent or higher-valent metal compounds are metal compounds having an alkali earth metal or a transition metal as a constituent element, and the examples of such metal species include Mg, Ca, Zn, Cu, Co, Fe, Ni, Al and Zr. Preferable among these are Mg, Ca, Zn, Cu and Co, and particularly preferable are the alkali earth metals, Mg and Ca. Examples of the forms of the metal compounds include; metals as simple substances; oxides; hydroxides; inorganic salts such as halides, carbonates and sulfates; and organic acid salts such as carboxylic acid salts and sulfonic acid salts. Preferable among these forms are oxides, hydroxides and carbonates. These are contained, while showing themselves in a particulate state, in the coating material for forming a gas-barrier layer and the gas-barrier multilayer body of the present invention.

Description is made on a treatment in which the surface of a monovalent metal compound or a divalent or higher-valent metal compound is coated with a poorly water-soluble component in the present invention. Known methods for coating the surface of a metal compound with a poorly water-soluble component may be used without being particularly limited. Examples of such a method include: a method using a silane coupling agent; a method in which the surface of a metal compound is coated with an organic component such as a fatty acid ester organic component or a phosphoric acid ester organic component; and a method in which the surface of a metal compound is coated with an inorganic compound such as calcium phosphate, aluminum hydroxide or barium sulfate. In the present invention, it is preferable to coat the surface of a metal compound with an organic component, and it is particularly preferable to coat the surface of a metal compound with a phosphoric acid ester organic component.

In the present invention, in the case where the surface of the monovalent metal compound is not coated with a poorly water-soluble component or the coating with the poorly water-soluble component is insufficient, the monovalent metal compound is rapidly reacted with the COOH groups in the polycarboxylic acid polymer. In particular, in the case where the number of moles of the monovalent metal compound having been reacted with the polycarboxylic acid polymer is 20 mol % or more in relation to the number of moles of the COOH groups in the polycarboxylic acid polymer, the reaction between the COOH groups in the polycarboxylic acid polymer and the OH groups in the polyalcohol polymer is remarkably inhibited, to remarkably degrade the function as the coating material for forming a gas-barrier layer. Similarly, in the case where the surface of the divalent or higher-valent metal compound is not coated with a poorly water-soluble component or the coating with the poorly water-soluble component is insufficient, the divalent or higher-valent metal compound is rapidly reacted with the COOH groups in the polycarboxylic acid polymer. Consequently, polycarboxylic acid aggregates are generated, and hence coating as the coating material may become impossible.

Accordingly, in the present invention, it is necessary, by coating the surface of the metal compound with a poorly water-soluble component, to retard the elution of the metal compound into the coating material for a gas barrier, and to prevent the rapid progress of the forming reaction between the metal compound and the COOH groups in the polycarboxylic acid polymer. In particular, the forms, recommended in the present invention, of the metal compound contained in the coating material for forming a gas-barrier layer are oxides, hydroxides and carbonates; in the case where the surface of each of these metal compounds is not coated with a poorly water-soluble component or the coating with the poorly water-soluble component is insufficient, the COOH groups in the polycarboxylic acid polymer in the coating material undergo a neutralization reaction to increase the pH of the coating material. When the pH of the coating material for forming a gas-barrier layer is increased, the function as the coating material for forming a gas-barrier layer is further remarkably degraded, or the aggregates of the polycarboxylic acid are generated, and consequently the coating as the coating material for forming a gas-barrier layer becomes impossible. Accordingly, in the present invention, it is necessary that the pH of the coating material for forming a gas-barrier layer be not increased until, after the metal compound whose surface is coated with a poorly water-soluble component is added to the mixture composed of the polyalcohol polymer and the polycarboxylic acid polymer, the coating and drying of the substrate film is completed, and it is preferable to rapidly coat and dry after preparation of the coating material for forming a gas-barrier layer.

The coating material for forming a gas-barrier layer of the present invention is a coating material that includes the polyalcohol polymer, the polycarboxylic acid polymer, and the divalent or higher-valent metal compound whose surface is coated with a poorly water-soluble component, or alternatively the monovalent metal compound whose surface is coated with a poorly water-soluble component and the divalent or higher-valent metal compound whose surface is coated with a poorly water-soluble component. By applying this coating material to the surface of a plastic substrate and applying thereafter a heat treatment, first the polyalcohol polymer and the polycarboxylic acid polymer are ester-cross-linked to each other to form a gas-barrier layer. The surface of the metal compound is coated with a poorly water-soluble component, and hence the initial barrier property is almost not affected by the metal compound. In the present invention, the particle surface of the metal compound is coated with a poorly water-soluble component, for the purposes that the reaction between the metal compound and the COOH groups in the polycarboxylic acid in the coating material is prevented, as described above, and the coagulation of the coating material for forming a gas-barrier layer is prevented, and a possibly larger amount of the COOH groups in the polycarboxylic acid polymer are subjected to the esterification reaction with the OH groups in the polyalcohol polymer.

Thereafter, during the storage, under high temperature and high humidity conditions, of the multilayer body having the gas-barrier layer formed on the surface of the substrate, cations are eluted from the metal compound, present in the gas-barrier layer, whose surface is coated with a poorly water-soluble component, the cations are reacted with the COOH groups in the unreacted polycarboxylic acid polymer in the formed gas-barrier layer and with the COOH groups generated by the hydrolysis reaction from the ester-cross-linking portions in the formed gas-barrier layer, and thus ionic cross-linkages having gas-barrier property are formed. Under high temperature and high humidity conditions, when no metal compound is contained in the gas-barrier-forming layer, the barrier property of the gas-barrier layer is remarkably degraded by the decomposition of the ester-cross-linkages; however, when the gas-barrier-forming layer contains the metal compound, the above-described ionic cross-linkage formation newly provides additional barrier property so as to enable the prevention of the degradation of the barrier property of the gas-barrier layer. Additionally, depending on the type of the poorly water-soluble component used and the type of the metal compound used, the barrier property may also be improved. In other words, the metal compound whose surface is coated with a poorly water-soluble component, contained in the coating material for forming a gas-barrier layer is a component to bear, in the gas-barrier multilayer body having the gas-barrier layer of the first aspect, the attainment of the initial, fundamental gas-barrier property of the formed gas-barrier layer, and the maintenance and improvement of the gas-barrier property in the case of long-time storage under high temperature and high humidity. The below-described metal compound whose surface is coated with a poorly water-soluble component, contained in the metal compound-containing resin layer constituting the gas-barrier layer of the second aspect, also functions in the same manner.

In other words, by using the coating material for forming a gas-barrier layer of the present invention, during the storage under high temperature and high humidity conditions, the ester-cross-linkages and the ionic cross-linkages enable the formation of the gas-barrier layer having dense cross-linked structure formed therein.

When only the monovalent metal compound is used as the metal compound whose surface is coated with poorly water-soluble component, it is difficult to acquire gas-barrier property after a long-term storage under high temperature and high humidity conditions. Only with the use in combination with the divalent and higher-valent metal compound, the gas-barrier property can be effectively acquired. This is probably because intermolecular cross-linkages are formed in the case of the divalent or higher-valent metal compound, but no intermolecular cross-linkages are formed in the case of the monovalent metal compound, and accordingly, when the ester-cross-linkages are decomposed by the long-term high temperature and high humidity conditions imposed thereon, no intermolecular cross-linkages can be formed.

In the coating material for forming a gas-barrier layer, the mixing ratio between the polyalcohol polymer and the polycarboxylic acid polymer, in terms of the molar ratio (OH group/COOH group) between the OH group and the COOH group, is preferably 0.01 to 20, more preferably 0.01 to 10, furthermore preferably 0.02 to 5 and most preferably 0.04 to 2.

When the proportion of the OH group is smaller than the above-described range, there is a possibility that the coating film formability is degraded. On the other hand, the proportion of the COOH group is smaller than the above-described range, it may be impossible to form the ester-cross-linked structure with the polyalcohol polymer in a sufficient cross-link density so as to be unsuccessful in sufficiently attaining the gas-barrier property under high humidity atmosphere.

In the coating material for forming a gas-barrier layer, the mixing amount of the divalent or higher-valent metal compound whose surface is coated with a poorly water-soluble component or the total mixing amount of the monovalent metal compound whose surface is coated with a poorly water-soluble component and the divalent or higher-valent metal compound whose surface is coated with a poorly water-soluble component varies largely depending on the metal species used, the form of the compound used and the type of the poorly water-soluble component used. However, in relation to the COOH group of the polycarboxylic acid polymer contained in the coating material, the number of moles of the divalent or higher-valent metal compound or the total number of moles of the monovalent metal compound and the divalent or higher-valent metal compound is preferably 10 to 1000 mol %, more preferably 25 to 500 mol % and most preferably 50 to 100 mol %.

When the mixing amount of the divalent or higher-valent metal compound whose surface is coated with a poorly water-soluble component or the total mixing amount of the monovalent metal compound whose surface is coated with a poorly water-soluble component and the divalent or higher-valent metal compound whose surface is coated with a poorly water-soluble component is smaller than the above-described range, the ionic cross-linking effect due to the addition of the metal compound is hardly reflected on the gas-barrier property. On the other hand, when the mixing amount of the metal compound is larger than the above-described range, the ester-cross-linkages between the polyalcohol polymer and the polycarboxylic acid polymer formed by heat treatment are disturbed to be hardly successful in attaining the gas-barrier property under high humidity atmosphere.

From the viewpoint of workability, the coating material for forming a gas-barrier layer of the present invention is preferably an aqueous dispersion and more preferably an aqueous solution. Accordingly, the polyalcohol polymer and the polycarboxylic acid polymer are preferably water-soluble, and the metal compound whose surface is coated with a poorly water-soluble component is preferably offered as an aqueous dispersion.

To the coating material for forming a gas-barrier layer of the present invention, for the purpose of enhancing the gas-barrier property, an inorganic layered compound may be added within a limit not to largely impair the properties of the coating material. The inorganic layered compound means an inorganic compound in which a layered structure is formed by unit crystalline layers laminated on each other. Specific examples of such a compound include zirconium phosphate (phosphate derivative-type compound), chalcogen compounds, lithium-aluminum composite hydroxide, graphite and clay minerals. Particularly preferable are inorganic layered compounds to be swollen and cleaved in a solvent.

Preferable examples of the clay minerals include montmorillonite, beidellite, saponite, hectorite, sauconite, vermiculite, fluoromica, white mica, paragonite, gold mica, black mica, lepidolite, margarite, clintonite, anandite, chlorite, donbassite, sudoite, cookeite, clinochlore, chamosite, nimite, tetrasililic mica, talc, pyrophyllite, nacrite, kaolinite, halloysite, chrysotile, sodium tainiolite, xanthophyllite, antigorite, dickite and hydrotalcite. Particularly referable among these is swellable fluoromica or montmorillonite.

These clay minerals may be either naturally occurring substances or artificially synthesized or modified substances, and also may be substances obtained by treated these substances with organic substances such as onium salts.

Among the above-described clay minerals, swellable fluoromica minerals are most preferable from the viewpoint of whiteness, are represented by the following formula and can be easily synthesized.

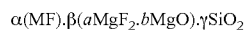

$$\alpha(MF)\cdot\beta(aMgF_2\cdot bMgO)\cdot\gamma SiO_2$$

wherein M represents sodium or lithium; $\alpha$, $\beta$, $\gamma$, a and b respectively represent coefficients, and respectively satisfy the following relations: $0.1 \leq \alpha \leq 2$, $2 \leq \beta \leq 3.5$, $3 \leq \gamma \leq 4$, $0 \leq a \leq 1$, $0 \leq b \leq 1$ and $a+b=1$.

Examples of the production method of such a swellable fluoromica mineral include a so-called melting method in which silicon oxide, magnesium oxide and various fluorides are mixed together, and the mixture thus obtained is completely melted in an electric furnace or a gas furnace within a temperature range from 1400 to 1500° C., and in the course of the cooling process, the crystals of a fluoromica mineral is grown in the reaction vessel.

There is another method in which talc is used as a starting material, and an alkali metal ion is intercalated into talc to yield a swellable fluoromica mineral (JP-A-02-149415). According to this method, an alkali fluorosilicate or an alkali fluoride is mixed with talc, and the mixture is heat treated for a short time in a porcelain crucible at a temperature of about 700 to 1200° C., and thus a swellable fluoromica mineral can be obtained.

In this preparation, the amount of the alkali fluorosilicate or the alkali fluoride to be mixed with talc is preferably set to fall within a range from 10 to 35% by mass in relation to the total mass of the mixture. When the amount falls outside this range, the production yield of the swellable fluoromica mineral is degraded.

For the purpose of obtaining the above-described swellable fluoromica mineral, the alkali metal in the alkali fluorosilicate or alkali fluoride is required to be either sodium or lithium. These alkali metals may be used each alone or in combination. Although by the use of potassium among the alkali metals, no swellable fluoromica mineral is obtained, the use of potassium in combination with sodium or lithium, with the proviso that the amount of potassium is limited, is possible for the purpose of controlling the swellability.

Mixing of a small amount of alumina in the process for producing the swellable fluoromica mineral enables to control the swellability of the produced swellable fluoromica mineral.

In the above-listed clay minerals, montmorillonite is represented by the following formula and can be obtained by purifying naturally-occurring montmorillonite.

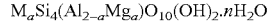

$$M_a Si_4(Al_{2-a}Mg_a)O_{10}(OH)_2 \cdot nH_2O$$

wherein M represents a sodium cation, and a is 0.25 to 0.60; the number of the water molecules bonded to the interlayer ion-exchangeable cations is variable according to the conditions such as the cation species and the humidity, and accordingly such water molecules are represented by $nH_2O$ here as well as in the following cases.

Examples of montmorillonite also include the isomorphic ion-substituted species represented by the following group, such as magnesian montmorillonite, iron montmorillonite and iron-magnesian montmorillonite. These may also be used in the present invention.

$$M_aSi_4(Al_{1.67-a}Mg_{0.5+a})O_{10}(OH)_2 \cdot nH_2O$$

$$M_aSi_4(Fe_{2-a}^{3+}Mg_a)O_{10}(OH)_2 \cdot nH_2O$$

$$M_aSi_4(Fe_{1.67-a}^{3+}Mg_{0.5+a})O_{10}(OH)_2 \cdot nH_2O$$

wherein M represents a sodium cation, and a is 0.25 to 0.60.

Usually, montmorillonite contains ion-exchangeable cations such as sodium ions and calcium ions between the layers thereof, and the content proportions of such cations vary depending on the production locations. In the present invention, preferable forms of montmorillonite are the forms in which interlayer ion-exchangeable cations are replaced with sodium ions by ion-exchange treatment or the like. It is preferable to use montmorillonite purified by treatment with water.

To the coating material for forming a gas-barrier layer of the present invention, a heat stabilizer, an antioxidant, a reinforcing material, a pigment, a degradation preventing agent, a weathering agent, a flame retardant, a plasticizer, a release agent, a lubricant and the like may be added within a limit not to largely impair the properties of the coating material.

Examples of the heat stabilizer, the antioxidant and the degradation preventing agent include hindered phenols, phosphorus compounds, hindered amines, sulfur compounds, copper compounds, halides of alkali metals, and mixtures of these.

Examples of the reinforcing material include clay, talc, calcium carbonate, zinc carbonate, wollastonite, silica, alumina, magnesium oxide, calcium silicate, sodium aluminate, sodium aluminosilicate, magnesium silicate, glass balloon, carbon black, zinc oxide, zeolite, hydrotalcite, metal fiber, metal whisker, ceramic whisker, potassium titanate whisker, boron nitride, graphite, glass fiber and carbon fiber.

Description is made on the method for preparing the coating material for forming a gas-barrier layer of the present invention.

When the polyalcohol polymer and the polycarboxylic acid polymer are mixed together to prepare an aqueous solution containing the mixture, it is preferable to add an alkali compound.

When the amount of the carboxylic acid units contained in the polycarboxylic acid polymer is large, the hydrophilicity of the polycarboxylic acid polymer itself is high, and consequently an aqueous solution of the polycarboxylic acid polymer can be prepared even without adding any alkali compound. However, addition of an appropriate amount of an alkali compound markedly improves the gas-barrier property of a film obtained by applying the coating material for forming a gas-barrier layer to the substrate.

Such an alkali compound is only required to be capable of neutralizing the carboxyl groups in the polycarboxylic acid polymer; examples of such an alkali compound include hydroxides of alkali metals and alkali earth metals, ammonium hydroxide and organic ammonium hydroxide compounds. Preferable among these are alkali metal hydroxides, from the viewpoints of the stability of the coating material and the odor generated at the time of heat treatment. The addition amount of the alkali compound is preferably 0.1 to 20 mol % in relation to the COOH group in the polycarboxylic acid polymer. However, when the polycarboxylic acid polymer is added in an amount of more than 20 mol % in relation to the COOH group in the polycarboxylic acid polymer, the gas-barrier property is largely degraded, and hence the addition amount of the alkali compound is more preferably 0.1 to 10 mol % in relation to the COOH group in the polycarboxylic acid polymer.

The preparation of the above-described aqueous solution may be conducted by using a dissolution pot or the like, equipped with a stirrer, according to a known method. For example, preferable is a method in which the polyalcohol polymer and the polycarboxylic acid polymer are separately prepared as aqueous solutions, the aqueous solution thus obtained are mixed together before use, and further a surface-treated metal compound is added to and mixed with the mixed solution. In this case, addition of the above-described alkali compound to the aqueous solution of the polycarboxylic acid polymer enables to improve the stability of this aqueous solution. Alternatively, the polyalcohol polymer and the polycarboxylic acid polymer may be simultaneously added to the water in the dissolution pot. In this case, when the alkali compound is added to the water at the start, the dissolution performance of the polycarboxylic acid polymer is better.

The solid content concentration of the coating material of the present invention is optionally variable according to the specifications of the coating apparatus and the drying-heating apparatus. However, with a too dilute solution, it is difficult to coat the layer having a sufficient thickness to attain the gas-barrier property, and disadvantageously the subsequent drying step tends to take a long time. On the other hand, with a too high solid content concentration of the coating material, it is difficult to obtain a uniform coating material, and disadvantageously the coatability tends to be unsatisfactory. From such viewpoints, the solid content concentration of the coating material is preferably within a range from 5 to 50% (by mass).

Detailed description is made on the gas-barrier multilayer body provided with a gas-barrier layer of the first aspect.

The gas-barrier multilayer body provided with a gas-barrier layer of the first aspect is a body in which a gas-barrier layer of the first aspect, derived from the above-described coating material for forming a gas-barrier layer is formed on a plastic substrate, directly or through the intermediary of an anchor coat layer.

Description is made on the plastic substrate constituting the gas-barrier multilayer body provided with a gas-barrier layer of the first aspect of the present invention. In the present invention, the plastic substrate may be a film-shaped substrate or may be substrates having various shapes of vessels such as bottles, cups and trays produced from a thermoformable thermoplastic resin by a technique such as extrusion molding, injection molding, blow molding, stretching blow molding or drawing molding. The substrate is preferably of a film shape. The plastic substrate may be formed of a single layer, or may be a substrate formed of a plurality of layers as obtained by techniques such as simultaneous melt extrusion and other lamination techniques.

Examples of the thermoplastic resin constituting the plastic substrate include olefin copolymers, polyesters, polyamides, styrene copolymers, vinyl chloride copolymers, acrylic copolymers and polycarbonate. Preferable are olefin copolymers, polyesters and polyamides.

Examples of the olefin copolymers include low-, medium- and high-density polyethylene, linear low-density polyethylene, polypropylene, ethylene-propylene copolymer, ethylene-butene copolymer, ionomers, ethylene-vinyl acetate copolymer and ethylene-vinyl alcohol copolymer. Examples of the polyesters include polyethylene terephthalate, polybutylene terephthalate, polyethylene terephthalate/isophthalate and polyethylene naphthalate. Examples of the polyamides include nylon 6, nylon 6,6, nylon 6,10 and meta-xylylene adipamide. Examples of the styrene copolymers include polystyrene, styrene-butadiene block copolymer, styrene-acrylonitrile copolymer and styrene-butadiene-acrylonitrile copolymer (ABS resin). Examples of the vinyl chloride copolymers include polyvinyl chloride and vinyl chloride-vinyl acetate copolymer. Examples of the acrylic copolymers include polymethyl methacrylate and methyl methacrylate-ethyl acrylate copolymer. These thermoplastic resins may be used each alone or as mixtures of two or more thereof. Among these thermoplastic resins, preferably quoted are: polyamide resins such as nylon 6, nylon 66 and nylon 46; aromatic polyester resins such as polyethylene terephthalate, polyethylene naphthalate, polytrimethylene terephthalate, polybutylene terephthalate and polybutylene naphthalate; aliphatic polyester resins such as polylactic acid; polyolefin resins such as polypropylene and polyethylene; and the mixtures of these.

To the thermoformable thermoplastic resin to be the raw material for the plastic substrate, where needed, one or two or more of additives such as a pigment, an antioxidant, an antistatic agent, an ultraviolet absorber, a lubricant and a preservative agent may be added within a range from 0.001 to 5.0 parts by mass in terms of total amount per 100 parts by mass of the resin.

When the plastic substrate constituting the gas-barrier multilayer body provided with a gas-barrier layer of the first aspect is a stretched film, the gas-barrier layer may be formed in such a way that a plastic substrate is stretched, and then the coating material for forming a gas-barrier layer is applied to the stretched plastic substrate and heated to form the gas-barrier layer. Alternatively, the coating material for forming a gas-barrier layer is applied to an unstretched plastic substrate, and by using the heat at the time of stretching, the gas-barrier formation and the stretching may be conducted simultaneously.

When a packaging material is formed by using the gas-barrier multilayer body provided with a gas-barrier layer of the first aspect of the present invention, for the purpose of ensuring the strength as a packaging material, a plastic substrate containing various reinforcing materials may be used as the plastic substrate constituting the gas-barrier multilayer body. Specifically, one or two or more of the following reinforcing materials may be mixed with the thermoplastic resin within a range from 2 to 150 parts by mass in terms of total amount per 100 parts by mass of the thermoplastic resin: fibrous reinforcing materials such as glass fiber, aromatic polyamide fiber, carbon fiber, pulp and cotton linter; powder reinforcing materials such as carbon black and white carbon; and flaky reinforcing materials such as glass flake and aluminum flake. For the purpose of bulking the resin, one or two or more of the following materials may be mixed, according to formulations known themselves without causing any trouble, with the thermoplastic resin within a range from 5 to 100 parts by mass in terms of total amount per 100 parts by mass of the thermoplastic resin: heavy or soft calcium carbonate, mica, talc, kaolin, gypsum, clay, barium sulfate, alumina powder, silica powder and magnesium carbonate.

When the gas-barrier layer is formed of the coating material for forming a gas-barrier layer, the coating material is directly applied to the plastic substrate, or to an anchor coat layer serving as an intermediary between the coating material and the substrate, and immediately after application, a heat treatment is conducted and thus the formation of the dried coating film and the heat treatment may be conducted simultaneously. Alternatively, the following method may be adopted: the coating material is applied, then the contained water and the like are evaporated by applying a technique such as blowing of hot air with a dryer or infrared ray irradiation to form a dried coating film, and thereafter a heat treatment is conducted. As long as the state of the gas-barrier layer and the physical properties of the gas-barrier layer such as gas-barrier property are not particularly impaired, it is preferable to conduct the heat treatment immediately after the application of the coating material, in consideration of the factors such as the contraction of the process. The heat treatment method is not particularly limited; in general, heat treatment is regarded as conducted under the dry atmosphere in an oven or the like. Alternatively, for example, the heat treatment may be conducted by contact with a hot roll.

The method for applying the coating material for forming a gas-barrier layer to the plastic substrate is not particularly limited; common methods such as gravure roll coating, reverse roll coating, wire bar coating and air knife coating may be used.

In any of the above-described cases, by heat treating, in an atmosphere heated to 100° C. or more, the plastic substrate to which the coating material for forming a gas-barrier layer is applied, the polyalcohol polymer and the polycarboxylic acid polymer contained in the coating material for forming a gas-barrier layer undergo cross-linking reaction to form ester bonds, and consequently a water-insoluble gas-barrier layer is formed.

The gas-barrier formation is affected by the factors such as the content ratio between the polyalcohol polymer and the polycarboxylic acid polymer, the inclusion or non-inclusion of additives and the contents of the additives where the additives are included; thus, although the heat treatment temperature in the gas-barrier formation may be specified conditionally, the heat treatment temperature concerned is preferably 100 to 300° C., more preferably 120 to 250° C., furthermore preferably 140 to 240° C. and particularly preferably 160 to 220° C.

When the heat treatment temperature is too low, it is impossible to allow the cross-linking reaction between the polyalcohol polymer and the polycarboxylic acid polymer to proceed to a sufficient extent, and accordingly it comes to be difficult to obtain a gas-barrier layer having a sufficient gas-barrier property as the case may be. On the other hand, when the heat treatment temperature is too high, there occurs a possibility that troubles such as embrittlement of the coating film occur.

The heat treatment time is required to be 5 seconds to 2 hours, and is usually 10 seconds to 30 minutes, preferably 20 seconds to 10 minutes and more preferably 30 seconds to 5 minutes.

When the heat treatment time is too short, the cross-linking reaction is not allowed to proceed to a sufficient extent, to make it difficult to obtain a film having gas-barrier property. On the other hand, when the heat treatment time is too long, the productivity is degraded.

In the present invention, on the basis of such a relatively shorter heat treatment as described above, the ester-cross-linked structure is formed between the OH groups in the polyalcohol polymer and the COOH groups in the polycarboxylic acid polymer, and thus the gas-barrier layer is obtained.

In the present invention, as the coating agent used for the anchor coat layer, known anchor coating agents can be used without being particularly limited. Examples of the anchor coating agent include isocyanate-based, polyurethane-based, polyester-based, polyethyleneimine-based, polybutadiene-based, polyolefin-based and alkyl titanate-based anchor coating agents. In view of the effects in the present invention, preferable among these are the isocyanate-based, polyurethane-based and polyester-based anchor coating agents. Specifically, preferable are one of isocyanate compounds, polyurethanes and urethane prepolymers, or mixtures of two or more of these compounds, and reaction products of these compounds; and mixtures and reaction products between isocyanate and one or two or more of polyesters, polyols and polyethers; and solutions and dispersions of these compounds.

The thickness of the gas-barrier layer formed on the plastic substrate is desirably set at least 0.1 μm or more for the purpose of sufficiently enhancing the gas-barrier property of the film.

In the present invention, the gas-barrier layer formed on the plastic substrate functions as follows. Specifically, when the plastic substrate with the gas-barrier layer formed thereon is stored under high temperature and high humidity atmosphere, the cations are isolated from the divalent or higher-valent metal compound, contained in the gas-barrier layer, whose surface is coated with a poorly water-soluble organic or inorganic component or the monovalent metal compound, contained in the gas-barrier layer, whose surface is coated with a poorly water-soluble organic or inorganic component and a divalent or higher-valent metal compound, contained in the gas-barrier layer, whose surface is coated with a poorly water-soluble organic or inorganic component; and the cations are reacted with the COOH groups in the gas-barrier layer to form the ionic cross-linked structure. Consequently, the degradation of the gas-barrier property due to the hydrolysis reaction of the ester-cross-linkage is suppressed, and the excellent gas-barrier property is maintained even when stored for a long time under high temperature and high humidity atmosphere. Accordingly, the coating material for forming a gas-barrier layer and the gas-barrier multilayer body of the present invention are applicable to various fields requiring the oxygen gas-barrier property, and particularly suitable in the field of food packaging.

Description is made on the gas-barrier multiplayer body provided with a gas-barrier layer of the second aspect of the present invention.

As described above, the gas-barrier layer of the second aspect is formed of two layers, namely, the barrier layer and the metal compound-containing resin layer. Specifically, the gas-barrier layer of the second aspect is formed of a barrier layer formed of a first coating material including a polyalcohol polymer and a polycarboxylic acid polymer and a metal compound-containing resin layer formed so as to abut to the barrier layer. The metal compound-containing resin layer is formed of a second coating material including: a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component; and a resin.

First, description is made on the barrier layer.

The barrier layer is formed of the first coating material. The first coating material includes a polyalcohol polymer and a polycarboxylic acid polymer, and does not include any metal compound whose surface is coated with a poorly water-soluble component. In other words, the first coating material is the same as the coating material for forming a gas-barrier layer used for forming the above-described gas-barrier layer of the first aspect, except that the first coating material does not include any metal compound whose surface is coated with a poorly water-soluble component.

The barrier layer is formed as follows: the first coating material is applied to the plastic substrate directly or through the intermediary of the metal compound-containing resin layer formed of the below-described second coating material; then the coated plastic substrate is subjected to a heat treatment in which the polyalcohol polymer and the polycarboxylic acid polymer are cross-linked to each other through ester bonds to form the barrier layer.

When the plastic substrate constituting the gas-barrier multilayer body provided with the gas-barrier layer of the second aspect is a stretched film, the barrier layer may also be formed as follows: the first coating material is applied to the plastic substrate having been stretched, directly or through the intermediary of the metal compound-containing resin layer formed of the below-described second coating material; then the coated plastic substrate is heated to produce ester bonds in the layer derived from the first coating material, and thus the barrier layer is formed.

Alternatively, when an unstretched plastic substrate is used, by taking advantage of the heat applied at the time of stretching, the formation of the barrier layer due to the production of the ester bonds may be conducted simultaneously with the stretching. For example:

(i) The first coating material is applied directly to the unstretched plastic substrate; heating is restricted to such an extent that drying is attained but no esterification is allowed to proceed; to the thus half-completed barrier layer, the below-described second coating material is applied; thus, the drying of the second coating material and the ester-cross-linking and stretching of the half-completed barrier layer can be conducted almost simultaneously.

(ii) As a matter of course, the following method is also possible: the first coating material is applied; then by taking advantage of the heat applied at the time of stretching, the formation of the barrier layer due to the production of the ester bonds is conducted simultaneously with the stretching; and thereafter the below-descried second coating material is applied to the formed barrier layer to form the metal compound-containing resin layer.

(iii) Additionally, the following method is also possible: when the barrier layer is disposed on the metal compound-containing resin layer formed of the below-described second coating material, the first coating material is applied to the metal compound-containing resin layer; and then by taking advantage of the heat applied at the time of stretching, the drying and the formation of the barrier layer due to the production of the ester bonds are conducted simultaneously with the stretching.

(iv) Yet additionally, the following method is also possible: the below-described second coating material is applied to the unstretched plastic substrate; then by taking advantage of the heat applied at the time of stretching, the formation of the metal compound-containing resin layer is conducted almost simultaneously with the stretching; and thereafter the first coating material is applied to the formed metal compound-containing resin layer and then heating is conducted to esterify the polyalcohol polymer and the polycarboxylic acid polymer.

Because a plurality of times of applications of a high-temperature and long-time heat testament causes a possibility that the physical properties of the plastic substrate are adversely affected, the heat treatment temperature is preferably 30 to 100° C. and more preferably 50 to 80° C. The heat treatment time is preferably 1 second to 5 minutes and more preferably 5 seconds to 2 minutes. Additionally, the smaller is the number of repetition of the heat treatment, the more preferable. In this connection, preferably the methods described above in (i) and (iii) are small in thermal history and efficient.

Description is made on the metal compound-containing resin layer.

The surface-treated metal compound contained in the metal compound-containing resin layer is the same as the metal compound whose surface is coated with a poorly water-soluble organic or inorganic component, contained in the coating material for forming a gas-barrier layer used for the formation of the above-described gas-barrier layer of the first aspect.

The metal compound-containing resin layer is a layer formed as follows: the second coating material, namely, a resin coating material containing a metal compound whose surface is coated with a poorly water-soluble organic or inorganic component is applied to the surface of a plastic substrate, the surface of the barrier layer formed on the plastic substrate, or the surface of the half-completed barrier layer formed on the plastic substrate, and then heat treatment is conducted to form the metal compound-containing resin layer.

In the method in which the aqueous solution or the dispersion of the metal compound is applied and heat treated, the metal salt is precipitated on the surface of the plastic substrate or the barrier layer to make the appearance of the surface unsatisfactory. On the contrary, as described above, the metal compound is mixed with a resin, the mixture is applied as a resin coating material and then heat treated, and thus, a gas-barrier multilayer body excellent in transparency can be obtained.

The metal compound contained in the metal compound-containing resin layer is recommended to be used in a form of as fine particles as possible from the viewpoint that the use of the metal compound in such a form results in excellent transparency as observed after the formation of the coating film by using the second coating material.

The average particle size of the fine particles is preferably 10 μm or less, more preferably 3 μm or less and most preferably 1 μm or less.

Description is made on the resin constituting the second coating material. Examples of this resin include known various resins such as urethane resin, polyester resin, acrylic resin, epoxy resin, alkyd resin, melamine resin and amino resin. Preferable among these are urethane resin, polyester resin and acrylic resin, and particularly preferable is urethane resin, from the viewpoints of water resistance, solvent resistance, heat resistance and curing temperature.

Urethane resin is a polymer obtained, for example, from the reaction between a multifunctional isocyanate compound and a hydroxyl group-containing compound. Specific examples of urethane resin may include the urethane resins obtained from the reaction between the following multifunctional isocyanate compounds and the following hydroxyl group-containing compounds. Examples of the multifunctional isocyanate compounds include aromatic polyisocyanates such as tolylene diisocyanate, diphenylmethane isocyanate and polymethylene polyphenylene polyisocyanate and aliphatic polyisocyanates such as hexamethylene diisocyanate and xylene isocyanate, and examples of the hydroxyl group-containing compounds include polyether polyols, polyester polyols, polyacrylate polyols and polycarbonate polyols.

The mixing ratio between the resin constituting the second coating material and the surface-treated metal compound varies largely depending on the metal species used, the form of the compound used and the type of the resin used. However, the mixing amount of the surface-treated metal compound is preferably 0.1 to 1000 parts by mass and more preferably 1 to 500 parts by mass in relation to 100 parts by mass of the resin solid content. When the mixing amount of the metal compound is less than 0.1 part by mass, the proportion of the cross-linked structure formed by the reaction between the cations eluted from the metal compound and the polycarboxylic acid polymer in the barrier-forming layer is decreased to degrade the gas-barrier property of the multilayer body. On the other hand, when the mixing amount of the metal compound exceeds 1000 parts by mass, it becomes impossible to obtain a uniform coating material, as the case may be.

The method for including the metal compound coated with a poorly water-soluble component in the second coating material is not particularly limited. Examples of such a method include: a method in which in a solution prepared by dissolving the resin component constituting the second coating material in a solvent, the metal compound whose surface is coated with a poorly water-soluble organic or inorganic component is mixed; a method in which in an emulsion prepared by dispersing the resin component constituting the second coating material in a solvent, the metal compound whose surface is coated with a poorly water-soluble organic or inorganic component is mixed; and a method in which the resin and the metal compound whose surface is coated with a poorly water-soluble organic or inorganic component are mixed together by thermal plasticizing and mixing to prepare a coating material. Preferable among these is the method in which in an emulsion prepared by dispersing the resin component constituting the second coating material in a solvent, the metal compound whose surface is coated with a poorly water-soluble organic or inorganic component is mixed, for the purpose of attaining a relatively uniform dispersion of the metal compound.

To each of the first coating material and the second coating material, a heat stabilizer, an antioxidant, a reinforcing material, a pigment, a degradation preventing agent, a weathering agent, a flame retardant, a plasticizer, a release agent, a lubricant and the like may be added within a limit not to largely impair the properties of the coating material.

Examples of the heat stabilizer, the antioxidant and the degradation preventing agent include hindered phenols, phosphorus compounds, hindered amines, sulfur compounds, copper compounds, halides of alkali metals, and mixtures of these.

Examples of the reinforcing material include clay, talc, calcium carbonate, zinc carbonate, wollastonite, silica, alumina, magnesium oxide, calcium silicate, sodium aluminate, sodium aluminosilicate, magnesium silicate, glass balloon, carbon black, zinc oxide, zeolite, hydrotalcite, metal fiber, metal whisker, ceramic whisker, potassium titanate whisker, boron nitride, graphite, glass fiber and carbon fiber.

A cross-linking agent may also be added, for the purpose of improving the water resistance, solvent resistance and the like of the formed metal compound-containing layer by heat treating after the application of the second coating material.

The addition amount of the cross-linking agent is preferably 0.1 to 300 parts by mass and more preferably 20 to 100 parts by mass in relation to 100 parts by mass of the second coating material. When the addition amount of the cross-linking agent is less than 0.1 part by mass, even the addition of the cross-linking agent cannot attain a remarkable cross-linking effect as compared to the case where no cross-linking agent is added. On the other hand, when the addition amount of the cross-linking agent exceeds 300 parts by mass, the metal amount in the metal compound-containing resin layer is relatively decreased, and the maintenance and improvement of the gas-barrier property in the case of long-time storage under high temperature and high humidity cannot be expected much.

The cross-linking agent may also be a cross-linking agent having self-cross-linkability, a compound having in the molecule thereof a plurality of functional groups that react with a carboxyl group and/or a hydroxyl group, a metal complex having a multivalent coordination position, or the like. Preferable among these are isocyanate compounds, melamine compounds, urea compounds, epoxy compounds and carbodiimide compounds, and particularly preferable are isocyanate compounds. Specifically, examples of such compounds include the following multifunctional isocyanates: aromatic polyisocyanates such as tolylene diisocyanate, diphenylmethane isocyanate and polymethylene polyphenylene polyisocyanate; and aliphatic polyisocyanates such as hexamethylene diisocyanate and xylene isocyanate. These cross-linking agents may be used in combination.

The concentration (=solid content) of the second coating material is optionally variable according to the specifications of the coating apparatus and the drying-heating apparatus. However, with a too dilute solution, it is difficult to coat the layer having a sufficient thickness to attain the gas-barrier property through the reaction with the barrier layer, and disadvantageously the subsequent drying step tends to take a long time. On the other hand, with a too high concentration of the coating material, it is difficult to obtain a uniform coating material, and disadvantageously the coatability tends to be unsatisfactory. From such viewpoints, the concentration (=solid content) of the second coating material is preferably set within a range from 5 to 50% (by mass).

When the metal compound-containing resin layer is formed of the second coating material, the second coating material is applied to the plastic substrate, or to the barrier layer which is formed on the plastic substrate, and immediately after application, a heat treatment is conducted and thus the formation of the dried coating film and the heat treatment may be conducted. Alternatively, the following method may be adopted: the coating material is applied, then the contained water and the like are evaporated by applying a technique such as blowing of hot air with a dryer or infrared ray irradiation to form a dried coating film, and thereafter a heat treatment is conducted. As long as the state of the barrier layer, the state of the metal compound-containing layer, and the physical properties of these layers such as gas-barrier property are not particularly impaired, it is preferable to conduct the heat treatment immediately after the application of the coating material, in consideration of the factors such as the contraction of the process. The heat treatment method is not particularly limited; in general, heat treatment is regarded as conducted under the dry atmosphere in an oven or the like. Alternatively, for example, the heat treatment may be conducted by contact with a hot roll.

Although depending on the thickness of the barrier layer, the thickness of the metal compound-containing resin layer is desirably made at least thicker than 0.1 μm for the purpose of attaining the gas-barrier property through the reaction with the barrier layer.

In the gas-barrier layer of the second aspect, it is essential that the barrier layer and the metal compound-containing resin layer be in contact with each other, for the purpose of making the metal compound, whose surface is coated with a poorly water-soluble component and which is contained in the metal compound-containing resin layer, effectively act on the composition constituting the barrier layer wherein the composition includes the polyalcohol polymer and the polycarboxylic acid polymer. Accordingly, the gas-barrier multilayer body provided with the gas-barrier layer of the second aspect requires that the plastic substrate, the barrier-forming layer and the metal compound-containing layer be laminated in this order, or in the order of the plastic substrate, the metal compound-containing resin layer and the barrier-forming layer.

In the second aspect, only once application of the high temperature heat treatment, after the plastic substrate, the barrier layer and the metal compound-containing resin layer are laminated, enables the production of a multilayer body having a high gas-barrier property.

Application of the high temperature heat treatment performs the ester-cross-linking involving the polyalcohol polymer and the polycarboxylic acid polymer in the first coating material. When a cross-linking agent is added to the second coating material, application of the high temperature heat treatment simultaneously performs the cross-linking reaction in the resin of the metal compound-containing resin layer. The heat treatment conditions are the same as in the case of the above-described first aspect.

Description is made on the role of the metal compound-containing resin layer in the second aspect. In the second aspect, the gas-barrier property immediately after the heat treatment of the multilayer body fabricated by the above-described fabrication method is attained by the ester-cross-linkages due to the polyalcohol polymer and the polycarboxylic acid polymer in the barrier layer. However, when the multilayer body is stored under long-term high temperature and high humidity conditions, the ester-cross-linkages due to the polyalcohol polymer and the polycarboxylic acid polymer in the barrier layer are decomposed by the hydrolysis reaction, and accordingly the barrier layer alone cannot maintain the demanded gas-barrier property. On the other hand, the provision of the metal compound-containing resin layer results in the elution of cations from the metal compound coated with a poorly water-soluble component in the metal compound-containing resin layer, in a long-term high temperature and high humidity atmosphere. These cations migrate into the barrier layer, and react with the unreacted portion of the polycarboxylic acid polymer or the COOH groups produced by the hydrolysis reaction to form the ionic cross-linkages having gas-barrier property. The formation of such ionic cross-linkages newly imparts the gas-barrier property, and hence enables to prevent the degradation of the gas-barrier property of the barrier-forming layer. Depending on the type of the applied coating treatment using the poorly water-soluble organic or inorganic component and the type of the metal compound, the barrier property can also be improved. In other words, the metal compound whose surface is coated with a poorly water-soluble component, contained in the metal compound-containing resin layer constituting the gas-barrier layer of the second aspect, is the component to bear the attainment of the initial, fundamental gas-barrier property of the formed gas-barrier layer, and the maintenance and improvement of the gas-barrier property in the case of long-time storage under high temperature and high humidity, in the same manner as in the metal compound whose surface is coated with a poorly water-soluble component contained in the coating material for forming the gas-barrier layer of the first aspect.

In other words, the metal compound-containing resin layer formed of the second coating material is disposed so as to abut to the barrier layer containing no metal compound whose surface is coated with a poorly water-soluble component, and consequently, it is possible to form a gas-barrier layer in which a dense cross-linked structure is formed with estercross-linkages and ionic cross-linkages, during storage under high temperature and high humidity conditions.

Description is made on the case where the surface of the metal compound is not coated with a poorly water-soluble component in the second aspect or the case where the surface of the metal compound is insufficiently coated with a poorly water-soluble component in the second aspect. When the second coating material is applied to form a layer so as to abut to the layer undergoing no ester-cross-linkage formation, obtained by drying the first coating material prior to ester-cross-linkage formation, the reaction between the COOH groups in the polycarboxylic acid polymer and the metal compound occurs in preference to the esterification reaction, consequently, the ester-cross-linking between the polyalcohol polymer and the polycarboxylic acid polymer does not occur to a sufficient extent, and accordingly, no sufficient barrier property is obtained. Additionally, when the barrier layer formed of the first coating material is formed on the plastic substrate, through the intermediary of the metal compound-containing resin layer formed of the second coating material, if the surface of the metal compound in the second coating material is not coated with a poorly water-soluble component, the reaction between the COOH groups in the polycarboxylic acid polymer and the metal compound occurs in preference to the esterification reaction in the same manner as described above, consequently the ester-cross-linking between the polyalcohol polymer and the polycarboxylic acid polymer does not occur to a sufficient extent, and accordingly, no sufficient barrier property is obtained.

In the present invention, for the purpose of protecting the metal compound-containing resin layer or the barrier-forming layer to be the outermost layer of the multilayer body, a protective layer formed of another resin layer may be further laminated on the surface of such an outermost layer.

Preferable as the protective layer is a resin layer that is formed of a known polymer group such as polyurethane resins, polyester resins and polyacrylic resins, and is excellent in the adhesion to the metal compound-containing resin layer or the barrier-forming layer to be the outermost layer of the multilayer body. Among these resin layers, coating layers formed of polyurethane resins are particularly preferable. Additionally, for the purpose of enhancing the antiblocking property of such a protective layer, the glass transition point of the resin to be used is preferably 30° C. or higher, more preferably 70° C. or higher and furthermore preferably 100° C. or higher.

According to the purposes such as enhancement of water resistance, the protective layer may be cross-linked by a known cross-linking method. Examples of such a cross-linking method include: a method in which self-cross-linking due to the silanol bond is utilized; and a method in which added is a compound having in the molecule thereof a plurality of groups to react with the functional groups such as the carboxyl groups and hydroxyl groups contained in the resin used for the protective layer. Preferable as such a compound are isocyanate compounds, melamine compounds, urea compounds, epoxy compounds and carbodiimide compounds, and particularly preferable are isocyanate compounds. Specific examples of such cross-linking agents are as described above.

To the protective layer, a heat stabilizer, an antioxidant, a reinforcing material, a pigment, a degradation preventing agent, a weathering agent, a flame retardant, a plasticizer, a release agent, a lubricant and the like may be added within a limit not to largely impair the properties of the protective layer. The protective layer is effectively utilized, for the purpose of preventing, for example, the bleeding out of the metal salt from the metal compound-containing resin layer, or the blocking of the film.

The gas-barrier multilayer body of the present invention may be laminated with a heat seal layer, through the intermediary of an adhesive or directly, for the purpose of obtaining an ink layer or an packaging bag, even in the cases where the multilayer body is provided with the gas-barrier layer of any of the first and second aspects.

The ink layer as referred to herein means a layer formed with inks for the purpose of forming characters, figures, patterns and the like. The inks are not particularly limited; examples of the inks include oil-based ink, water-based ink and active energy-curable ink such as UV curable ink.

Examples of the composition of such an ink include, in addition to a solvent, for example, conventionally used ink binders including additives such as various pigments, extender pigments, plasticizers, drying agents and stabilizers; wherein examples of the ink binders include: synthetic resins such as modified alkyd resin, polyvinyl butyral, polyamide, polyolefin, polyurethane, acrylic resin, polyester, polyvinyl chloride, polyvinyl alcohol, ethylene-vinyl acetate copolymer, ethylene-vinyl alcohol copolymer, ethylene-ethyl acrylate copolymer and chlorinated polypropylene; natural resins such as wood rosin, polymerized rosin, rosin ester and shellac; fibers such as cellulose, nitrocellulose, ethyl cellulose, cellulose acetate, cellulose acetate propionate; and gum derivatives such as cyclized gum and chlorinated gum.

Usable examples of the method for forming the ink layer include well known coating methods such as offset printing, gravure printing, flexo printing, gravure offset printing, silk screen printing, seal printing and ink-jet printing.

Usable examples of the method for laminating the heat seal layer include wet lamination, dry lamination, solventless dry lamination, extrusion lamination, T-die coextrusion molding and coextrusion lamination, wherein lamination is conducted through the intermediary of an adhesive or directly.

The type of the above-described adhesive is not particularly limited; known usable examples of the adhesive type include aqueous type, solvent type, emulsion type, dispersion type and solventless type. Acceptable examples of the adhesion mechanism type include any of chemical reaction type, solvent-evaporation type, heat-melt type and thermocompression bonding type.

From the viewpoint of the composition, examples of the adhesive include: anchor coating agents such as isocyanate (urethane) anchor coating agents, polyethyleneimine anchor coating agents, polybutadiene anchor coating agents and organotitanium anchor coating agents; polyurethane adhesives; polyvinyl alcohol adhesives; polyethylene-vinyl alcohol adhesives; polyacrylic adhesives such as polyethylene-ethylene acrylic acid, polyethyl acrylate, polybutyl acrylate and 2-ethylhexyl ester; polyester adhesives; epoxy adhesives; polyvinyl acetate adhesives; cellulose adhesives; polyamide adhesives; polyimide adhesives; amino resin adhesives such as urea resin and melamine resin; phenolic resin adhesives; epoxy resin adhesives; reaction-type (meth)acrylic adhesives; gum adhesives such as chloroprene gum, nitrile gum and styrene-butadiene gum; silicone adhesives; and inorganic adhesives composed of alkali metal silicates or low-melting-point glass.

Particularly suitably usable among the above-listed adhesive are two-part reaction-type polyurethane adhesives, one-part reaction-type isocyanate group-terminated prepolymer polyurethane adhesives and one-part reaction-type acrylic adhesives because these adhesives are satisfactory in adhesion to a relatively large number of types of films, and provide satisfactory productivity due to reactions and curing allowed to occur at low temperatures.

With the adhesives, the following additives may be mixed where needed: an antioxidant, an ultraviolet absorber, a hydrolysis preventing agent, an antifungal agent, a thickener, a plasticizer, a pigment, a filler, a silane coupling agent and a surface conditioner. Additionally, for the purpose of controlling the curing reaction, additives such as known catalysts and additives may also be used.

Examples of the method for forming these adhesive layers include direct roll coating, reverse roll coating, gravure (direct) coating, air knife coating, squeeze coating, blade coating, comma coating, curtain flow coating, kiss coating, extrusion coating and other methods. The coating amount of the adhesive is preferably 0.1 to 10 g/m$^2$ (in dryness) and more preferably 1 to 5 g/m$^2$ (in dryness).

Usable examples of the heat seal layer include low-density polyethylene film, medium-density polyethylene film, high-density polyethylene film, linear low-density polyethylene film, polypropylene film, ethylene-vinyl acetate copolymer resin film, ionomer resin film, ethylene-acrylic acid copolymer resin film, ethylene-ethyl acrylate copolymer resin film, ethylene-methacrylic acid copolymer film, ethylene-propylene copolymer film, methylpentene resin film and polybutene resin film. Additional usable examples of the heat seal layer include films made of the following resins: acid-modified polyolefin resins obtained by modifying polyolefin resins such as polyethylene and polypropylene with unsaturated carboxylic acids such as acrylic acid, methacrylic acid, maleic acid, maleic anhydride, fumaric acid and itaconic acid; polyvinyl acetate resins, poly(meth)acrylic resins and polyvinyl chloride resins.

EXAMPLES

Hereinafter, specific description is made on the present invention with reference to Examples and Comparative Examples. However, the present invention is not limited to these Examples.

In following Examples and Comparative Examples, the oxygen gas-barrier property was evaluated by measuring the oxygen gas permeability under an atmosphere of a temperature of 20° C. and a relative humidity of 85%, with an oxygen barrier measurement apparatus (OX-TRAN 2/20, manufactured by Mocon, Inc.). From the measurement results, the oxygen permeability of the gas barrier layer was derived on the basis of the following formula:

$$1/P\text{total} = 1/P_I + 1/P_{II}$$

wherein

Ptotal: Measurement result
$P_I$: Oxygen permeability of the plastic substrate
$P_{II}$: Oxygen permeability of the gas-barrier layer On the other hand, when the gas-barrier layer is divided into the barrier-forming layer and the metal compound-containing layer:

$$P_{II} = P_{IIA} + P_{IIB}$$

wherein $P_{IIA}$: Oxygen permeability of the barrier-forming layer
$P_{IIB}$: Oxygen permeability of the metal compound-containing layer In following Examples and Comparative Examples, the exterior appearance of each of the multilayer bodies was visually evaluated in such a way that the case where the exterior appearance was transparent was evaluated as G (Good) and the case where the exterior appearance failure such as whitening was identified was evaluated as P (Poor).

Example 1

Particulate lithium carbonate was dispersed in water by using a stirrer to prepare an aqueous dispersion of lithium carbonate having a solid content of 10% (by mass). To this aqueous dispersion of lithium carbonate, an emulsion of sodium stearate heated to 80° C. was added in such a way that the amount of sodium stearate was 1.5 parts by mass in relation to 100 parts by mass of lithium carbonate; the aqueous mixture was stirred for 15 to 30 minutes to yield an aqueous dispersion of lithium carbonate whose surface was coated with sodium stearate.

Polyvinyl alcohol (Poval 124, saponification degree: 99 to 98%, average polymerization degree: 2400, manufactured by Kuraray Co., Ltd) was dissolved in hot water and the aqueous solution was cooled down to room temperature to yield an aqueous solution of polyvinyl alcohol having a solid content of 10% (by mass). 10 mol % of the COOH groups of ethylene-maleic anhydride copolymer (weight average molecular weight: 100000) were neutralized with sodium hydroxide to prepare an aqueous solution of EMA having a solid content of 10% (by mass). The aqueous solution of polyvinyl alcohol and ethylene-maleic anhydride copolymer were mixed together in such a way that the molar ratio (OH group/COOH group) between the OH group of the aqueous solution of polyvinyl alcohol and the COOH group of ethylene-maleic anhydride copolymer was 0.67, to yield a mixed solution having a resin solid content of 100 (by mass). Then, the pH of the mixed solution was 3.0. To this mixed solution, magnesium oxide whose surface was coated with a fatty acid ester organic component (KISUMA 5A, manufactured by Kyowa Chemical Industry Co., Ltd.) and the above-described lithium carbonate coated with sodium stearate were each added in an amount so as to be 50 mol % in relation to the COOH group in EMA, to yield a coating material for forming a gas-barrier layer. No pH variation was found in the coating material for forming a gas barrier to which added were magnesium oxide and lithium carbonate the surface of each of which was coated with the above-described component, the pH being kept at 3.0.

To a biaxially stretched nylon 6 film (Emblem, thickness: 15 μm, manufactured by Unitika Ltd.), the above-described coating material for forming a gas-barrier layer was applied with a gravure roll coater, dried at 80° C. for 2 minutes, and thereafter dried and heat treated for 2 minutes in a heated atmosphere at 200° C., to fabricate a gas-barrier film having a 1.5-μm-thick gas-barrier layer.

The oxygen permeability Ptotal of the obtained gas-barrier film and the oxygen permeability $P_{II}$ of the obtained gas-barrier layer were measured. The gas-barrier film after completion of measurement was allowed to stand in an environment of 50° C. and of a humidity of 90% for 5 days or 30 days. Thereafter, the oxygen permeability of the gas-barrier film and the oxygen permeability of the gas-barrier layer were measured again. The results thus obtained are shown in Table 1.

TABLE 1

| | | Surface-treated metal compounds | | | | | Oxygen gas-barrier property (ml/m² · day · MPa) | | | | | |
|---|---|---|---|---|---|---|---|---|---|---|---|---|
| | | Monovalent metal compound | | | Divalent metal compound | | | Immediately after fabrication | | After 5 days at 50° C. and 90% RH | | After 30 days at 50° C. and 90% RH | |
| | | Component | Surface treatment agent | Addition amount[1] (mol %) | Component | Surface treatment agent | Addition amount[1] (mol %) | $P_{total}$ | $P_{II}$ | $P_{total}$ | $P_{II}$ | $P_{total}$ | $P_{II}$ |
| Examples | 1 | Lithium carbonate | Sodium stearate | 50 | Magnesium oxide | Fatty acid ester based | 50 | 25.4 | 26.4 | 30.3 | 31.7 | 32.1 | 33.6 |
| | 2 | carbonate | stearate | 10 | oxide | ester based | 10 | 28.4 | 29.6 | 15.1 | 15.4 | 18.1 | 18.6 |
| | 3 | | | 10 | | | 50 | 28.3 | 29.5 | 43.1 | 45.9 | 47.1 | 50.5 |
| | 4 | | | | | | 10 | 29.2 | 30.5 | 19.8 | 20.4 | 21.2 | 21.9 |
| | 5 | — | — | — | | | 50 | 26.7 | 27.8 | 50.4 | 54.3 | 55.1 | 59.8 |
| | 6 | — | — | — | | | 10 | 28.3 | 29.5 | 22.5 | 23.2 | 26.1 | 27.1 |
| | 7 | Lithium | Sodium | 50 | Magnesium | Phosphoric | 50 | 27.3 | 28.4 | 15.2 | 15.5 | 17.1 | 17.5 |
| | 8 | carbonate | stearate | | oxide | acid ester | 10 | 25.9 | 26.9 | 10.3 | 10.5 | 10.9 | 11.1 |
| | 9 | | | 10 | | based | 50 | 24.3 | 25.2 | 18.3 | 18.8 | 20.8 | 21.4 |
| | 10 | | | | | | 10 | 28.4 | 29.6 | 15.6 | 16.0 | 16.6 | 17.0 |
| | 11 | — | — | — | | | 50 | 25.6 | 26.6 | 23.1 | 23.9 | 25.1 | 26.0 |
| | 12 | — | — | — | | | 10 | 26.1 | 27.1 | 19.8 | 20.4 | 22.3 | 23.0 |
| | 13 | Lithium | Sodium | 50 | Calcium | Phosphoric | 50 | 24.3 | 25.2 | 56.1 | 61.0 | 59.3 | 64.8 |
| | 14 | carbonate | stearate | | carbonate | acid | 10 | 26.8 | 27.9 | 43.2 | 46.0 | 45.1 | 48.2 |
| | 15 | | | 10 | | | 50 | 25.2 | 26.1 | 71.2 | 79.3 | 76.2 | 85.5 |
| | 16 | | | | | | 10 | 28.6 | 29.8 | 51.1 | 55.1 | 60.9 | 66.7 |
| | 17 | — | — | — | | | 50 | 27.3 | 28.4 | 80.9 | 91.5 | 81.5 | 92.2 |
| | 18 | — | — | — | | | 10 | 25.0 | 25.9 | 60.5 | 66.2 | 70.6 | 78.5 |
| Comparative Examples | 1 | — | — | — | — | — | — | 25.1 | 26.0 | 125.6 | 153.1 | 323.8 | 602.5 |
| | 2 | — | — | — | Magnesium oxide | None | 50 | Aggregates occurred to disturb coating | | | | | |
| | 3 | Lithium carbonate | Sodium stearate | 50 | Magnesium oxide | | | Aggregates occurred to disturb coating | | | | | |
| | 4 | carbonate | stearate | | — | — | — | 23.1 | 23.9 | 10.4 | 10.6 | 150.6 | 191.9 |

[1]Addition amount in relation to COOH of EMA

Examples 2 to 6

In each of Examples 2 to 6, the addition amounts of magnesium oxide and lithium carbonate, the surface of each of which was coated with a poorly water-soluble component, in the coating material for forming a gas-barrier layer were altered as shown in Table 1. No pH variation was found in the coating material for forming a gas barrier to which added were magnesium oxide and lithium carbonate the surface of each of which was coated with a poorly water-soluble component. Thereafter, in the same manner as in Example 1, gas-barrier films were obtained. The oxygen permeability of each of the obtained gas-barrier films and the oxygen permeability of each of the obtained gas-barrier layers were measured, and the results thus obtained are shown in Table 1.

Examples 7 to 12

As compared to Examples 1 to 6, the magnesium oxide, coated with a fatty acid ester organic component added in the coating material for forming a gas-barrier layer was altered to magnesium oxide coated with a phosphoric acid ester organic component (KISUMA 5J, manufactured by Kyowa Chemical Industry Co., Ltd.). Additionally, the addition amounts of the metal compound were set as shown in Table 1. Otherwise, in the same manner as in Example 1, coating materials for forming a gas barrier were prepared. No pH variation was found in the coating material for forming a gas barrier to which added were magnesium oxide and lithium carbonate the surface of each of which was coated with a poorly water-soluble component. Thereafter, in the same manner as in Example 1, gas-barrier films were obtained. The oxygen permeability of each of the obtained gas-barrier films and the oxygen permeability of each of the obtained gas-barrier layers were measured, and the results thus obtained are shown in Table 1.

Examples 13 to 18

Calcium carbonate was dispersed in water by using a stirrer to prepare an aqueous dispersion of calcium carbonate having a solid content of 100 (by mass). To this aqueous dispersion, a 5% aqueous solution of phosphoric acid was added in an amount of 3.0% by mass in relation to calcium carbonate, and the aqueous dispersion was stirred for 15 to 30 minutes to yield a dispersion of calcium carbonate coated with calcium phosphate.

As compared to Examples 1 to 12, magnesium oxide coated with a fatty acid ester organic component or a phosphoric acid ester organic component, added in the coating material for forming a gas-barrier layer was altered to the above-described calcium carbonate coated with calcium phosphate, and the addition amounts of the metal compounds were set as shown in Table 1. Otherwise, in the same manner as in Example 1, coating materials for forming a gas barrier were prepared. No pH variation was found in the coating material for forming a gas barrier to which added were calcium carbonate and lithium carbonate the surface of each of which was coated with a poorly water-soluble component. Thereafter, in the same manner as in Example 1, gas-barrier films were obtained. The oxygen permeability of each of the obtained gas-barrier films and the oxygen permeability of each of the obtained gas-barrier layers were measured, and the results thus obtained are shown in Table 1.

Comparative Example 1

In the coating material for forming a gas-barrier layer, no metal compound whose surface was coated with a poorly water-soluble component was added. Otherwise, in the same manner as in Example 1, a gas-barrier film was obtained. The oxygen permeability of the obtained gas-barrier film and the oxygen permeability of the obtained gas barrier layer were measured, and the results thus obtained are shown in Table 1.

Comparative Example 2

As the metal compound added in the coating material for forming a gas-barrier layer, only magnesium oxide whose surface was not coated with a poorly water-soluble component was used. Consequently, the pH of the coating material was increased from 3.0 to 6.0, and moreover, aggregates were generated in the coating material. An attempt was made to obtain a gas-barrier film in the same manner as in Example 1, but application of the coating material to the film was found difficult.

Comparative Example 3

As the metal compound added in the coating material for forming a gas-barrier layer, magnesium oxide whose surface was not coated with a poorly water-soluble component and lithium carbonate whose surface was coated with a poorly water-soluble component were used. Consequently, the pH of the coating material was increased from 3.0 to 6.0, and moreover, aggregates were generated in the coating material. An attempt was made to obtain a gas-barrier film in the same manner as in Example 1, but application of the coating material to the film was found difficult.

Comparative Example 4

The metal compound added in the coating material for forming a gas-barrier layer was restricted only to lithium carbonate coated with sodium stearate. No pH variation was found in the coating material for forming a gas barrier to which added was lithium carbonate coated with sodium stearate. Otherwise, in the same manner as in Example 1, a gas-barrier film was obtained. The oxygen permeability of the obtained gas-barrier film and the oxygen permeability of the obtained gas barrier layer were measured, and the results thus obtained are shown in Table 1.

As can be seen from the results shown in Table 1, the gas-barrier films of Examples 1 to 18 gave the following results: the divalent or higher-valent metal compound whose surface was coated with a poorly water-soluble component was added to or the monovalent metal compound whose surface was coated with a poorly water-soluble component and the divalent or higher-valent metal compound whose surface was coated with a poorly water-soluble component were added to the coating material for forming a gas-barrier layer including polyalcohol polymer and polycarboxylic acid polymer, and consequently the oxygen permeability was not degraded or was degraded to a small extent even by being allowed to stand under the long-term high temperature-high humidity storage conditions, or the oxygen permeability was improved by being allowed to stand under high temperature-high humidity storage conditions. In these Examples, the following results were verified: lithium carbonate whose surface was coated with sodium stearate was added to the coating material for forming a gas barrier, and consequently the degradation degree of the oxygen permeability was decreased; depending on the film formation conditions, the oxygen permeability was made smaller; and additionally, as the organic component for coating the surface of magnesium oxide, the phosphoric acid ester based component was superior to the fatty acid ester based component on the basis of the smaller degradation degree of the oxygen permeability found for the phosphoric acid ester based component.

On the other hand, Comparative Examples individually offered the following problems.

In Comparative Example 1, the following result was verified: the divalent or higher-valent metal compound whose surface was coated with a poorly water-soluble component was not added to or alternatively the monovalent metal compound whose surface was coated with a poorly water-soluble component and the divalent or higher-valent metal compound whose surface was coated with a poorly water-soluble component were not added to the coating material for forming a gas-barrier layer including the polyalcohol polymer and the polycarboxylic acid polymer, and consequently the oxygen permeability was remarkably degraded by being allowed to stand under long-term high temperature-high humidity storage conditions.

In Comparative Examples 2 and 3, magnesium oxide whose surface was not coated with a poorly water-soluble component was added, and thus the ethylene-maleic anhydride copolymer and the magnesium oxide in the coating material were allowed to react with each other. Consequently, the pH of the coating material for forming a gas barrier was increased, and moreover, aggregates due to the ethylene-maleic anhydride copolymer and the magnesium oxide were generated to make it difficult to apply the coating material to the film.

In Comparative Example 4, the divalent or higher-valent metal compound whose surface was coated with a poorly water-soluble organic or inorganic component was not added to but only the monovalent metal compound whose surface was coated with sodium stearate was added to the coating material for forming a gas-barrier layer including polyalcohol polymer and the polycarboxylic acid polymer. Consequently, the improvement of the oxygen permeability was verified in short-term storage under high temperature-high humidity, but the oxygen permeability was verified to be remarkably degraded in long-term storage under high temperature-high humidity.

Example 19

According to the same formulation as in Example 1, an aqueous solution of polyvinyl alcohol and an ethylene-maleic anhydride copolymer were mixed together, to yield the same mixed solution (a first coating material for forming a barrier-forming layer) as obtained in Example 1, having a solid content of 10% (by mass).

According to the same formulation as in Example 1, lithium carbonate whose surface was coated with sodium stearate was obtained.

To an aqueous dispersion of polyurethane (Takerack W605, manufactured by Mitsui Takeda Chemical Co., Ltd.), the same magnesium oxide as used in Example 1 whose surface was coated with a fatty acid ester organic component (KISUMA 5A, manufactured by Kyowa Chemical Industry Co., Ltd.), the above-described lithium carbonate whose surface was coated with sodium stearate and purified water were added to yield a mixed solution (a second coating material for forming a metal compound-containing layer) having a resin solid content of 10% (by mass). In this preparation, the contents of the lithium carbonate whose surface was coated with sodium stearate and the magnesium oxide whose surface was coated with a fatty acid ester organic component were each controlled to be 50 mol % in relation to the COOH group in EMA. It is to be noted that no pH variation in the coating material was verified between before and after the addition, to the aqueous dispersion of polyurethane, of the metal compounds the surface of each of which was coated with a poorly water-soluble component, the pH being kept at 7.4.

To the surface of the same biaxially stretched nylon 6 film as used in Example 1, the second coating material was applied with a gravure roll coater, and then dried and heat treated for 1 minute in an atmosphere of 80° C. to form a 0.5-μm-thick metal compound-containing layer.

Successively, to the metal compound-containing layer, the first coating material was applied with a gravure roll coater, and dried and heat treated in a hot air drying furnace set at 200° C. for 2 minutes to form a 0.8-μm-thick barrier-forming layer. Thus, a multilayer body in which the film to be the substrate, the metal compound-containing layer and the barrier-forming layer were laminated in this order was obtained. The gas-barrier layer was formed with the metal compound-containing layer and the barrier-forming layer. The oxygen permeability Ptotal of the obtained multilayer body and the oxygen permeability $P_{II}$ of the obtained gas-barrier layer were measured immediately after the fabrication of the multilayer body and after being allowed to stand in an environment of 50° C. and of a humidity of 90% for 5 days or 30 days, and the thus obtained measurement results are shown in Table 2. The results of the visual evaluation of the exterior appearance are also shown in Table 2.

which was coated with a poorly water-soluble component were altered to the contents shown in Table 2. No pH variation was found in the coating material for forming a gas barrier to which added were magnesium oxide and lithium carbonate the surface of each of which was coated with a poorly water-soluble component. Otherwise, in the same manner as in Example 19, multilayer bodies were obtained. The oxygen permeability of each of the obtained multilayer bodies and the oxygen permeability of each of the obtained gas-barrier layers were measured. The results thus obtained are shown in Table 2.

Examples 25 to 30

As compared to Examples 19 to 24, magnesium oxide coated with a fatty acid ester organic component in the metal compound-containing layer was altered to magnesium oxide coated with a phosphoric acid ester treatment agent (KISUMA 5J, manufactured by Kyowa Chemical Industry Co., Ltd.), and the contents of the metal compounds were set as shown in Table 2. No pH variation was found in the coating material for forming a gas barrier to which added were magnesium oxide and lithium carbonate the surface of each of which was coated with a poorly water-soluble component.

TABLE 2

| | | Added metal compounds | | | | | Oxygen gas-barrier property ($ml/m^2 \cdot day \cdot MPa$) | | | | | | |
|---|---|---|---|---|---|---|---|---|---|---|---|---|---|
| | | Monovalent metal compound | | | Divalent metal compound | | | Immediately | After 5 days at | | After 30 days | | |
| | | Component | Surface treatment agent | Addition amount[1] (mol %) | Component | Surface treatment agent | Addition amount[1] (mol %) | after fabrication | | 50° C. and 90% RH | | at 50° C. and 90% RH | | Exterior appearance |
| | | | | | | | | Ptotal | P II | Ptotal | P II | Ptotal | P II | |
| Examples | 19 | Lithium carbonate | Sodium stearate | 50 | Magnesium oxide | Fatty acid ester based | 50 | 23.2 | 24.0 | 25.3 | 26.2 | 28.1 | 29.3 | G |
| | 20 | | | | | | 20 | 25.4 | 26.4 | 15.4 | 15.7 | 16.3 | 16.7 | G |
| | 21 | | | 20 | | | 50 | 25.1 | 26.0 | 36.5 | 38.5 | 28.1 | 29.3 | G |
| | 22 | | | | | | 20 | 23.2 | 24.0 | 18.2 | 18.7 | 20.1 | 20.7 | G |
| | 23 | — | — | — | | | 50 | 21.4 | 22.1 | 78.5 | 88.4 | 79.2 | 89.3 | G |
| | 24 | — | — | — | | | 20 | 23.4 | 24.2 | 57.6 | 62.8 | 60.1 | 65.7 | G |
| | 25 | Lithium carbonate | Sodium stearate | 50 | Magnesium oxide | Phosphoric acid ester based | 50 | 22.4 | 23.1 | 12.4 | 12.6 | 11.1 | 11.3 | G |
| | 26 | | | | | | 20 | 20.3 | 20.9 | 10.3 | 10.5 | 10.8 | 11.0 | G |
| | 27 | | | 20 | | | 50 | 24.1 | 25.0 | 17.2 | 17.6 | 18.3 | 18.8 | G |
| | 28 | | | | | | 20 | 21.8 | 22.5 | 15.6 | 16.0 | 17.0 | 17.4 | G |
| | 29 | — | — | — | | | 50 | 23.9 | 24.7 | 21.0 | 21.6 | 21.8 | 22.5 | G |
| | 30 | — | — | — | | | 20 | 20.4 | 21.0 | 46.0 | 49.2 | 47.5 | 51.0 | G |
| | 31 | Lithium carbonate | Sodium stearate | 50 | Calcium carbonate | Phosphoric acid | 50 | 22.2 | 22.9 | 57.1 | 62.2 | 59.2 | 64.7 | G |
| | 32 | | | | | | 20 | 20.1 | 20.7 | 31.2 | 32.7 | 33.8 | 35.5 | G |
| | 33 | | | 20 | | | 50 | 24.7 | 25.6 | 63.2 | 69.5 | 68.0 | 75.3 | G |
| | 34 | | | | | | 20 | 23.7 | 24.5 | 49.1 | 52.8 | 51.2 | 55.2 | G |
| | 35 | — | — | — | | | 50 | 25.9 | 26.9 | 88.3 | 101.0 | 90.9 | 104.5 | G |
| | 36 | — | — | — | | | 20 | 20.8 | 21.4 | 65.4 | 72.1 | 67.1 | 74.2 | G |
| Comparative Examples | 5 | — | — | — | — | — | — | 20.5 | 21.1 | 136.4 | 169.4 | 358.4 | 734.4 | G |
| | 6 | — | — | — | Magnesium oxide | — | 50 | 270.3 | 440.3 | 380.4 | 833.2 | 416.1 | 1026.0 | G |
| | 7 | Lithium carbonate | — | 50 | Magnesium oxide | Fatty acid ester based | 50 | 312.0 | 562.9 | 412.4 | 1003.8 | 453.4 | 1287.0 | G |
| | 8 | — | Sodium stearate | — | — | — | — | 25.1 | 26.0 | 10.5 | 10.7 | 258.9 | 410.9 | G |
| | 9[2] | | | | Magnesium oxide | Fatty acid ester based | 50 | 25.9 | 26.9 | 28.3 | 29.5 | 30.1 | 31.5 | P |

[1] Addition amount in relation to COOH of ethylene-maleic anhydride copolymer
[2] A coating material including no resin component was used.

Examples 20 to 24

As compared to Example 19, the contents, in the metal compound-containing layer of the gas-barrier layer, of magnesium oxide and lithium carbonate the surface of each of Otherwise, in the same manner as in Example 19, multilayer bodies were obtained. The oxygen permeability of each of the obtained multilayer bodies and the oxygen permeability of each of the obtained gas-barrier layers were measured. The results thus obtained are shown in Table 2.

Examples 31 to 36

According to the same formulation as in Examples 13 to 18, a powder of calcium carbonate coated with calcium phosphate was obtained.

As compared to Examples 19 to 30, magnesium oxide coated with a fatty acid ester organic component in the metal compound-containing layer was altered to the above-described calcium carbonate coated with calcium phosphate, and the contents of the metal compounds were set as shown in Table 2. No pH variation was found in the coating material for forming a gas barrier to which added were magnesium oxide and lithium carbonate the surface of each of which was coated with a poorly water-soluble component. Otherwise, in the same manner as in Example 19, multilayer bodies were obtained. The oxygen permeability of each of the obtained multilayer bodies and the oxygen permeability of each of the obtained gas-barrier layers were measured. The results thus obtained are shown in Table 2.

Comparative Examples 5 to 8

The types of the metal compounds in the metal compound-containing layer, the poorly water-soluble components to cover the surface of the metal compounds and the contents of the metal compounds were altered as shown in Table 2. Otherwise, in the same manner as in Example 19, multilayer bodies were obtained. The oxygen permeability of each of the obtained multilayer bodies and the oxygen permeability of each of the obtained gas-barrier layers were measured. The results thus obtained are shown in Table 2.

Comparative Example 9

As the second coating material for forming the metal compound-containing layer, an aqueous dispersion of the above-described lithium carbonate coated with sodium stearate and the above-described magnesium oxide coated with a fatty acid ester organic component was used, and a mixed solution containing no polyurethane resin was used. Otherwise, in the same manner as in Example 19, multilayer bodies were obtained. The oxygen permeability of each of the obtained multilayer bodies and the oxygen permeability of each of the obtained gas-barrier layers were measured. The results thus obtained are shown in Table 2.

As can be seen from the results shown in Table 2, the gas-barrier films of Examples 19 to 36 gave the following results: the second coating material including the divalent or higher-valent metal compound whose surface was coated with a poorly water-soluble component or alternatively including the monovalent metal compound whose surface was coated with a poorly water-soluble component and the divalent or higher-valent metal compound whose surface was coated with a poorly water-soluble component was applied so as to laminate on the first coating material, namely, the coating material for forming a gas-barrier layer including an aqueous solution of polyvinyl alcohol and including an ethylene-maleic anhydride copolymer, and consequently the oxygen permeability was not degraded or was degraded to a small extent even by being allowed to stand under the long-term high temperature-high humidity storage conditions, or the oxygen permeability was improved by being allowed to stand under high temperature-high humidity storage conditions. In these Examples, the following results were verified: lithium carbonate whose surface was coated with sodium stearate was added to the second coating material, and consequently the degradation degree of the oxygen permeability was decreased; depending on the film formation conditions, the oxygen permeability was made smaller; and additionally, as the poorly water-soluble component for coating the surface of magnesium oxide, the phosphoric acid ester based component was superior to the fatty acid ester based component on the basis of the smaller degradation degree of the oxygen permeability found for the phosphoric acid ester based component.

On the other hand, Comparative Examples individually offered the following problems.

In Comparative Example 5, the following result was verified: the divalent or higher-valent metal compound whose surface was coated with a poorly water-soluble component was not added to or alternatively the monovalent metal compound whose surface was coated with a poorly water-soluble component and the divalent or higher-valent metal compound whose surface was coated with a poorly water-soluble component were not added to the second coating material, and consequently the oxygen permeability was remarkably degraded by being allowed to stand under long-term high temperature-high humidity storage conditions.

In Comparative Example 6, the surface of the magnesium oxide added to the second coating material was not coated with a poorly water-soluble component, consequently when the first coating material was applied to the metal compound-containing layer formed of the second coating material, the ethylene-maleic anhydride copolymer and magnesium oxide reacted with each other before the first coating material underwent the thermally-caused ester-cross-linking reaction, and consequently the ester-cross-linking reaction was not allowed to proceed. As a result, the oxygen permeability was poor from immediately after the fabrication of the multilayer body.

In Comparative Example 7, the surface of the lithium carbonate added to the second coating material was not coated with a poorly water-soluble component, consequently when the first coating material was applied to the metal compound-containing layer formed of the second coating material, the ethylene-maleic anhydride copolymer and lithium carbonate reacted with each other before the first coating material underwent the thermally-caused ester-cross-linking reaction, and consequently the ester-cross-linking reaction was not allowed to proceed. As a result, the oxygen permeability was poor from immediately after the fabrication of the multilayer body.

In Comparative Example 8, the divalent or higher-valent metal compound whose surface was coated with a poorly water-soluble component was not added to the second coating material. However, the monovalent metal compound whose surface was coated with a poorly water-soluble component was added. Consequently, the improvement of the oxygen permeability was verified in short-term storage under high temperature-high humidity, but the oxygen permeability was verified to be remarkably degraded in long-term storage under high temperature-high humidity.

In Comparative Example 9, no resin component was included in the second coating material, and consequently, the exterior appearance after application of the coating material was poor.

Example 37

As compared to Example 19, the first coating material to form the barrier-forming layer was applied to a biaxially stretched nylon 6 film with a gravure roll coater, and dried and heat treated in a hot air drying furnace set at 80° C. for 1 minute to form a 0.8-µm-thick barrier-forming layer. Successively, to the barrier-forming layer, the second coating material was applied with a gravure roll coater, and dried and heat treated in an atmosphere of 200° C. for 2 minutes to form a 0.5-μm-thick metal compound-containing layer.

Otherwise in the same manner as in Example 19, a multilayer body in which the film to be the substrate, the barrier-forming layer and the metal compound-containing layer were laminated in this order was obtained. The gas-barrier layer was formed with the barrier-forming layer and the metal compound-containing layer. The measurement results of the oxygen permeability Ptotal of the multilayer body and the oxygen permeability $P_{II}$ of the gas-barrier layer are shown in Table 3.

manner as in Example 37, multilayer bodies were obtained. The oxygen permeability of each of the obtained multilayer bodies and the oxygen permeability of each of the obtained gas-barrier layers were measured. The results thus obtained are shown in Table 3.

Comparative Example 14

As the second coating material for forming the metal compound-containing layer, the same coating material as used in Comparative Example 9 was used. Otherwise, in the same manner as in Example 37, a multilayer body was obtained. The oxygen permeability of the obtained multilayer body and

TABLE 3

| | | Added metal compounds | | | | | Oxygen gas-barrier property (ml/m² · day · MPa) | | | | | | |
|---|---|---|---|---|---|---|---|---|---|---|---|---|---|
| | | Monovalent metal compound | | | Divalent metal compound | | | Immediately | After 5 days at 50° C. and 90% RH | | After 30 days at 50° C. and 90% RH | | Exterior appearance |
| | | Component | Surface treatment agent | Addition amount[1] (mol %) | Component | Surface treatment agent | Addition amount[1] (mol %) | after fabrication | | | | | |
| | | | | | | | | Ptotal | P II | Ptotal | P II | Ptotal | P II | |
| Examples | 37 | Lithium carbonate | Sodium stearate | 50 | Magnesium oxide | Fatty acid ester based | 50 | 19.8 | 20.4 | 30.1 | 31.5 | 32.7 | 34.3 | G |
| | 38 | | | | | | 20 | 21.6 | 22.3 | 16.6 | 17.0 | 18.1 | 18.6 | G |
| | 39 | | | 20 | | | 50 | 22.7 | 23.5 | 47.2 | 50.6 | 46.3 | 49.6 | G |
| | 40 | | | | | | 20 | 23.1 | 23.9 | 18.3 | 18.8 | 19.0 | 19.5 | G |
| | 41 | — | — | — | | | 50 | 25.2 | 26.1 | 73.4 | 82.0 | 74.5 | 83.4 | G |
| | 42 | — | — | — | | | 20 | 20.4 | 21.0 | 51.3 | 55.4 | 53.1 | 57.5 | G |
| | 43 | Lithium carbonate | Sodium stearate | 50 | Magnesium oxide | Phosphoric acid ester based | 50 | 23.2 | 24.0 | 10.4 | 10.6 | 11.2 | 11.4 | G |
| | 44 | | | | | | 20 | 20.8 | 21.4 | 8.1 | 8.2 | 9.8 | 9.9 | G |
| | 45 | | | 20 | | | 50 | 24.2 | 25.1 | 15.3 | 15.6 | 16.9 | 17.3 | G |
| | 46 | | | | | | 20 | 22.5 | 23.2 | 12.4 | 12.6 | 13.1 | 13.3 | G |
| | 47 | — | — | — | | | 50 | 21.4 | 22.1 | 19.8 | 20.4 | 21.2 | 21.9 | G |
| | 48 | — | — | — | | | 20 | 20.8 | 21.4 | 38.4 | 40.6 | 40.0 | 42.4 | G |
| | 49 | Lithium carbonate | Sodium stearate | 50 | Calcium carbonate | Phosphoric acid | 50 | 21.8 | 22.5 | 60.3 | 66.0 | 64.1 | 70.6 | G |
| | 50 | | | 20 | | | 20 | 19.2 | 19.7 | 32.8 | 34.4 | 35.8 | 37.7 | G |
| | 51 | | | 20 | | | 50 | 21.4 | 22.1 | 68.3 | 75.7 | 70.1 | 77.9 | G |
| | 52 | | | | | | 20 | 23.2 | 24.0 | 45.4 | 48.5 | 48.3 | 51.9 | G |
| | 53 | — | — | — | | | 50 | 22.5 | 23.2 | 75.3 | 84.4 | 74.1 | 82.9 | G |
| | 54 | — | — | — | | | 20 | 23.6 | 24.4 | 58.3 | 63.6 | 59.1 | 64.5 | G |
| Comparative Examples | 10 | — | — | — | — | — | — | 23.5 | 24.3 | 143.1 | 179.9 | 371.8 | 793.0 | G |
| | 11 | — | — | — | Magnesium oxide | — | 50 | 283.4 | 476.2 | 401.2 | 939.9 | 431.2 | 1122.9 | G |
| | 12 | Lithium carbonate | — | 50 | Magnesium oxide | Fatty acid ester based | 50 | 333.3 | 636.2 | 451.2 | 1269.5 | 483.8 | 1566.4 | G |
| | 13 | | Sodium stearate | | — | — | — | 23.2 | 24.0 | 11.8 | 12.0 | 284.1 | 478.2 | G |
| | 14[2] | | | | Magnesium oxide | Fatty acid ester based | 50 | 22.4 | 23.1 | 28.3 | 29.5 | 29.1 | 30.4 | P |

[1]Addition amount in relation to COOH of ethylene-maleic anhydride copolymer
[2]A coating material including no resin component was used.

Examples 38 to 54

The types of the metal compounds in the metal compound-containing layer, the poorly water-soluble components to cover the surface of the metal compounds and the contents of the metal compounds were altered as shown in Table 3. Otherwise, in the same manner as in Example 37, multilayer bodies were obtained. The oxygen permeability of each of the obtained multilayer bodies and the oxygen permeability of each of the obtained gas-barrier layers were measured. The results thus obtained are shown in Table 3.

Comparative Examples 10 to 13

The types of the metal compounds in the metal compound-containing layer, the coating conditions with poorly water-soluble components and the contents of the metal compounds were altered as shown in Table 3. Otherwise, in the same the oxygen permeability of the obtained gas-barrier layer were measured. The results thus obtained are shown in Table 3.

As can be seen from the results shown in Table 3, the gas-barrier films of Examples 37 to 54 gave the following results: the second coating material including the divalent or higher-valent metal compound whose surface was coated with a poorly water-soluble component or alternatively including the monovalent metal compound whose surface was coated with a poorly water-soluble component and the divalent or higher-valent metal compound whose surface was coated with a poorly water-soluble component was applied so as to laminate on the first coating material, namely, the coating material for forming a gas-barrier layer including an aqueous solution of polyvinyl alcohol and including an ethylene-maleic anhydride copolymer, and consequently the oxygen permeability was not degraded or was degraded to a small extent even by being allowed to stand under the long-term high temperature-high humidity storage conditions, or the oxygen permeability was improved by being allowed to stand under high temperature-high humidity storage conditions. In these Examples, the following results were verified: lithium carbonate whose surface was coated with a poorly water-soluble component was added to the second coating material, and consequently the degradation degree of the oxygen permeability was decreased; depending on the film formation conditions, the oxygen permeability was made smaller; and additionally, as the poorly water-soluble component for coating the surface of magnesium oxide, the phosphoric acid ester based component was superior to the fatty acid ester based component on the basis of the smaller degradation degree of the oxygen permeability found for the phosphoric acid ester based component.

On the other hand, Comparative Examples 10 to 14 offered the following problems.

In Comparative Example 10, the following result was verified: the divalent or higher-valent metal compound coated with a poorly water-soluble component was not added to or alternatively the monovalent metal compound coated with a poorly water-soluble component and the divalent or higher-valent metal compound coated with a poorly water-soluble component were not added to the second coating material, and consequently the oxygen permeability was remarkably degraded by being allowed to stand under long-term high temperature-high humidity storage conditions.

In Comparative Example 11, the magnesium oxide added to the second coating material was not coated with a poorly water-soluble component, consequently when the second coating material was applied to the first coating material, the ethylene-maleic anhydride copolymer and magnesium oxide reacted with each other before the first coating material underwent the thermally-caused ester-cross-linking reaction, and consequently the ester-cross-linking reaction was not allowed to proceed. As a result, the oxygen permeability was poor from immediately after the fabrication of the multilayer body.

In Comparative Example 12, the lithium carbonate added to the second coating material was not coated with a poorly water-soluble component, consequently when the second coating material was applied to the first coating material, the ethylene-maleic anhydride copolymer and lithium carbonate reacted with each other before the first coating material underwent the thermally-caused ester-cross-linking reaction, and consequently the ester-cross-linking reaction was not allowed to proceed. As a result, the oxygen permeability was poor from immediately after the fabrication of the multilayer body.

In Comparative Example 13, the divalent or higher-valent metal compound coated with a poorly water-soluble component was not added to the second coating material. However, the monovalent metal compound coated with a poorly water-soluble component was added. Consequently, the improvement of the oxygen permeability was verified in short-term storage under high temperature-high humidity, but the oxygen permeability was verified to be remarkably degraded in long-term storage under high temperature-high humidity.

In Comparative Example 14, no resin component was included in the second coating material, and consequently, the exterior appearance after application of the coating material was poor.

The invention claimed is:

1. A coating material for forming a gas-barrier layer, comprising:
    a polyalcohol polymer;
    a polycarboxylic acid polymer, and
    a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component,
    wherein the mixing ratio between the polyalcohol polymer and the polycarboxylic acid polymer, in terms of the molar ratio (OH group/COOH group) between the OH group and the COOH group, is 0.01 to 20, and the poorly water-soluble component coating the surface of each of the metal compounds is a fatty acid ester organic compound, a phosphoric acid ester organic compound, aluminum hydroxide, or barium sulfate.

2. The coating material for forming a gas-barrier layer according to claim 1, wherein the polyalcohol polymer is polyvinyl alcohol, a copolymer between ethylene and vinyl alcohol, or a saccharide.

3. The coating material for forming a gas-barrier layer according to claim 1, wherein the polycarboxylic acid polymer is a polymer that is obtained by polymerizing a monomer having a carboxyl group or an acid anhydride group and an ethylenically unsaturated double bond and contains a carboxyl group or an acid anhydride group but no hydroxyl group.

4. The coating material for forming a gas-barrier layer according to claim 3, wherein the polycarboxylic acid polymer is an ethylene-maleic acid copolymer.

5. The coating material for forming a gas-barrier layer according to claim 1, wherein the monovalent metal compound is a compound comprising at least one metal selected from the group consisting of alkali metals and the divalent or higher-valent metal compound is a compound comprising a metal selected from the group consisting of alkali earth metals and transition metals.

6. The coating material for forming a gas-barrier layer according to claim 5, wherein the alkali metal is at least one metal selected from the group consisting of Li, Na and K, and the alkali earth metal or the transition metal is at least one metal selected from the group consisting of Mg, Ca, Zn, Cu and Co.

7. A gas-barrier multilayer body comprising a plastic substrate layer and a gas-barrier layer,
    wherein the gas-barrier layer is formed of a coating material for forming a gas-barrier layer, the coating material comprising:
    a polyalcohol polymer;
    a polycarboxylic acid polymer; and
    a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component,
    wherein the mixing ratio between the polyalcohol polymer and the polycarboxylic acid polymer, in terms of the molar ratio (OH group/COOH group) between the OH group and the COOH group, is 0.01 to 20, and the poorly water-soluble component coating the particle surface of each of the metal compounds is a fatty acid ester organic compound, a phosphoric acid ester organic compound, aluminum hydroxide, or barium sulfate.

8. A gas-barrier multilayer body comprising a plastic substrate layer and a gas-barrier layer, wherein the gas-barrier layer is formed by laminating two layers consisting of a barrier layer formed of a coating material comprising a polyalcohol polymer and a polycarboxylic acid polymer, the mixing ratio between the polyalcohol polymer and the polycarboxylic acid polymer, in terms of the molar ratio (OH group/COOH group) between the OH group and the COOH group, is 0.01 to 20, and a metal compound-containing resin layer, wherein the metal compound-containing resin layer comprising:

a divalent or higher-valent metal compound whose surface is coated with a poorly water-soluble component, or alternatively a monovalent metal compound whose surface is coated with a poorly water-soluble component and a divalent or higher-valent metal compound whose surface is coated with a poorly water-soluble component; and a resin, wherein the poorly water-soluble component coating the particle surface of each of the metal compounds is a fatty acid ester organic compound, a phosphoric acid ester organic compound, aluminum hydroxide, or barium sulfate.

9. The gas-barrier multilayer body according to claim 8, wherein the polyalcohol polymer is polyvinyl alcohol, a copolymer between ethylene and vinyl alcohol, or a saccharide.

10. The gas-barrier multilayer body according to claim 8, wherein the polycarboxylic acid polymer is a polymer that is obtained by polymerizing a monomer having a carboxyl group or an acid anhydride group and an ethylenically unsaturated double bond and contains a carboxyl group or an acid anhydride group but no hydroxyl group.

11. The gas-barrier multilayer body according to claim 10, wherein the polycarboxylic acid polymer is an ethylene-maleic acid copolymer.

12. The gas-barrier multilayer body according to claim 8, wherein the monovalent metal compound is a compound comprising at least one metal selected from the group consisting of alkali metals and the divalent or higher-valent metal compound is a compound comprising a metal selected from the group consisting of alkali earth metals and transition metals.

13. The gas-barrier multilayer body according to claim 12, wherein the alkali metal is at least one metal selected from the group consisting of Li, Na and K, and the alkali earth metal or the transition metal is at least one metal selected from the group consisting of Mg, Ca, Zn, Cu and Co.

14. The coating material for forming a gas-barrier layer according to claim 2, wherein the polycarboxylic acid polymer is a polymer that is obtained by polymerizing a monomer having a carboxyl group or an acid anhydride group and an ethylenically unsaturated double bond and contains a carboxyl group or an acid anhydride group but no hydroxyl group.

15. The coating material for forming a gas-barrier layer according to claim 14, wherein the polycarboxylic acid polymer is an ethylene-maleic acid copolymer.

* * * * *